(12) United States Patent
Teulet

(10) Patent No.: US 10,850,351 B2
(45) Date of Patent: Dec. 1, 2020

(54) METHOD AND FACILITY FOR MANUFACTURING A THREE-DIMENSIONAL OBJECT

(71) Applicant: INETYX, Châteaugay (FR)

(72) Inventor: Patrick Teulet, Riom (FR)

(73) Assignee: INETYX, Châteaugay (FR)

( * ) Notice: Subject to any disclaimer, the term of this patent is extended or adjusted under 35 U.S.C. 154(b) by 235 days.

(21) Appl. No.: 16/068,763

(22) PCT Filed: Jan. 11, 2017

(86) PCT No.: PCT/EP2017/050455
§ 371 (c)(1),
(2) Date: Jul. 9, 2018

(87) PCT Pub. No.: WO2017/121746
PCT Pub. Date: Jul. 20, 2017

(65) Prior Publication Data
US 2019/0015932 A1 Jan. 17, 2019

(30) Foreign Application Priority Data

Jan. 12, 2016 (FR) ...................................... 16 50220

(51) Int. Cl.
*B23K 26/342* (2014.01)
*B33Y 10/00* (2015.01)
*B33Y 30/00* (2015.01)

(52) U.S. Cl.
CPC ............ *B23K 26/342* (2015.10); *B33Y 10/00* (2014.12); *B33Y 30/00* (2014.12)

(58) Field of Classification Search
CPC .. B23K 26/342; B23K 15/0086; B23K 26/34; B23K 35/30; B23K 35/322; B23K 26/32;
(Continued)

(56) References Cited

U.S. PATENT DOCUMENTS 4,772,773 A * 9/1988 Hashimoto ........ B23K 15/0086
219/121.64
7,455,740 B2   11/2008 Bostanjoglo et al.
(Continued)

FOREIGN PATENT DOCUMENTS

CN      101495265 A    7/2009
CN      103084573 A    5/2013
(Continued)

OTHER PUBLICATIONS

International Search Report, dated May 8, 2017, from corresponding PCT/EP2017/050455 application.
(Continued)

*Primary Examiner* — Phuong T Nguyen
(74) *Attorney, Agent, or Firm* — Nixon & Vanderhye

(57) ABSTRACT

Disclosed is a method in which flat layers are produced in succession so each newly produced layer is stacked on a previously produced layer or on a flat metal support, each layer having at least one metal strip occupying the entire thickness of the corresponding layer. The production of each layer includes: deposition, during which part of the strip is pressed against the previously produced layer or the support; a fusion step carried out during the deposition step during which only a fused portion of the part is fusion-welded to the previously produced layer or to the support; and repeating the deposition and fusion steps, applying them to corresponding parts of the or each strip offset from each other along a second axis perpendicular to the first axis, such that the fused portions of two of the parts following each other along the second axis overlap.

19 Claims, 17 Drawing Sheets

(58) Field of Classification Search
CPC ............ B23K 2103/26; B23K 2103/02; B23K 2103/04; B23K 2103/08; B23K 2103/14; B23K 2103/18; B33Y 10/00; B33Y 30/00
USPC ............ 219/121.14, 121.64, 121.66, 121.82, 219/76.14
See application file for complete search history.

(56) References Cited

U.S. PATENT DOCUMENTS

| | | |
|---|---|---|
| 2005/0268998 A1 | 12/2005 | Bostanjoglo et al. |
| 2017/0144252 A1 | 5/2017 | Arjakine et al. |

FOREIGN PATENT DOCUMENTS

| | | |
|---|---|---|
| CN | 104159724 A | 11/2014 |
| DE | 10 2014 206143 A1 | 10/2015 |
| EP | 1 400 339 A1 | 3/2004 |
| EP | 2 591 876 A1 | 5/2013 |
| JP | 2015-202594 A | 11/2015 |

OTHER PUBLICATIONS

FR Search Report, dated Sep. 7, 2016 from corresponding FR 1 650 220 application.

* cited by examiner

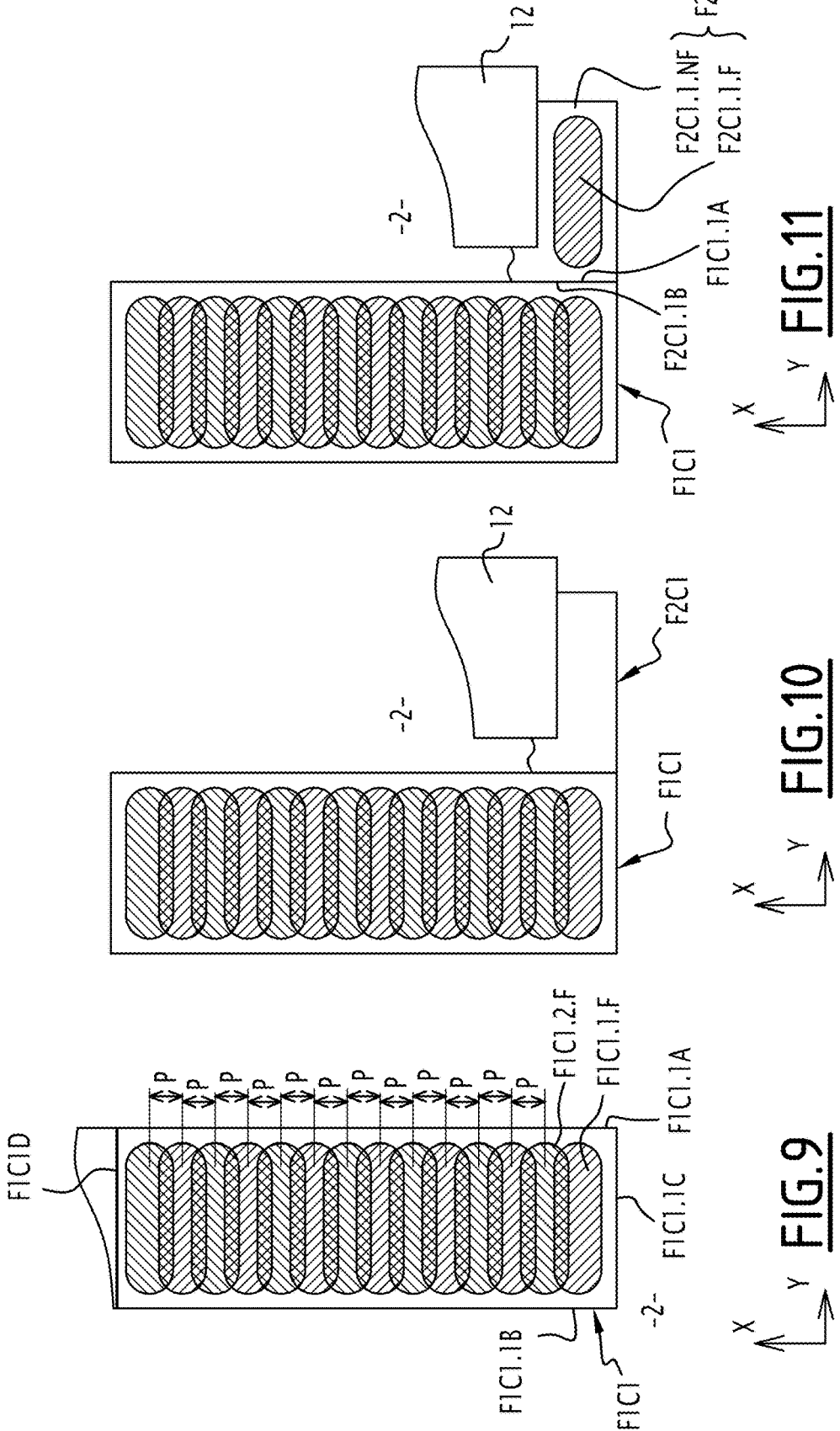

METHOD AND FACILITY FOR MANUFACTURING A THREE-DIMENSIONAL OBJECT

OBJECT

The present invention relates to a method for manufacturing a three-dimensional object. It also relates to a corresponding facility making it possible to carry out this manufacturing method.

Manufacturing a three-dimensional object by adding material layer by layer is well known, in particular by sintering and/or fusion, under the effect of a laser beam or an electron beam, of a metal or ceramic powder. The corresponding manufacturing methods are widely proposed today in various industrial sectors, such as aeronautics, automobiles, equipment manufacturing, jewelry, costume jewelry, clockwork, the medical field, research, etc.

These manufacturing methods are of great importance, both technically, in particular in relation to increased performance and the miniaturization of functions, and economically, in particular in connection with production costs and time frames and flexibility for the marketing of new products, not to mention strategically, in order to develop new concepts and new materials.

The known methods have a certain number of drawbacks and/or limitations, both in terms of their implementation and relative to the technical features of the manufactured three-dimensional objects.

The difficulties or complexity of implementation are related to the use of powdered materials, spread in a thin layer in order to establish and control the powder bed in which the part is manufactured iteratively, layer by layer. Powdered materials, i.e., in the powdered state with a small particle size, typically with a grain diameter of several micrometers, are difficult to manufacture industrially. Aside from the manufacturing costs and high investment levels needed, the difficulties are related to the dangerousness of the products due to their volatility, generating environmental contamination risks and explosion risks. Difficulties also appear during powder recycling operations, due to the fact that, during the implementation of manufacturing methods, waste, in particular fumes made up of nanometric particles, are produced. These difficulties cause the establishment of complex operating methods, in order to provide the control and maintenance of the metallurgical characteristics over time with respect to the targeted and qualified objectives, and in order to guarantee aspects related to the operating safety of the machines for carrying out the methods and user health. Furthermore, the production of powders, in particular metal powders, requires implementing substantial industrial resources, such as atomization towers, grinding equipment, sieving selection equipment to control the particle size, physicochemical analysis equipment, drying equipment and packaging equipment. All of these resources lead to investments and high production costs: the price of a kilogram of metal powder is five to ten times that of the same metallurgical grade in standard format, typically in bar, ingot or wire form. Additionally, the physics of powders limits the efficiency of the thermal energy provided by a laser beam, due to the significance of the specific surfaces inducing a high reactivity of the powders during the interaction with the laser beam: this phenomenon results in a partial sublimation of the material, which may modify the chemical composition of this material, phase changes and/or metallurgical structure flaws, typically porosities or micro-cracks inside the manufactured volumes. All of these phenomena limit the potential for productivity with respect to the available laser energy.

In general, the increased productivity of manufacturing methods by sintering and/or laser fusion of powders, ceramics and/or metals decreases the dimensional, geometric and surface state qualities of the manufactured three-dimensional objects. This situation is a limiting factor regarding the overall improvement of the technical and economic performance of this type of manufacturing method.

Thus, EP 1,400,339 discloses a method for layer-by-layer manufacturing of a complete three-dimensional part. According to this method, each layer of material is deposited on a previously produced layer or, if the latter is not present, on a planar metal support. Each layer of material can be a layer of compacted powder or a metal strip. In all cases, in order to locally fuse each successively deposited layer of material, laser beams sweep this layer of material, from one edge of the latter to the opposite edge. This method has the same quality limitations as those explained in detail above.

The aim of the present invention is to propose an additive manufacturing method that is innovative and breaks with the methods for additive layer-by-layer powder manufacturing.

To that end, the invention relates to a method for manufacturing a three-dimensional object, wherein planar layers are produced one after another such that each newly produced layer is superimposed, along a first axis that is perpendicular to the respective planes of the layers, on a layer previously produced or, if the latter is not present, on a planar metal support that is perpendicular to the first axis, each of these layers being made up of at least one metal strip such that the or each strip of each layer occupies the entire thickness, along the first axis, of the corresponding layer, said method providing, to produce each layer:

- carrying out a deposition step, during the entire duration of which a part of the or each strip of the layer to be produced is pressed, along the first axis, in contact against the layer previously produced or, if the latter is not present, against the support;
- carrying out a fusion step, which is done during the deposition step and during which only a portion, called fused, of said part of the or each strip is welded by fusion to the layer previously produced or, if the latter is not present, the support, such that, at the end of this fusion step, the rest of said part, which has not been fused, includes the edges of said part, arranged transversely to the plane of the layer to be produced, and is still in contact with the layer previously produced or, if the latter is not present, the support; and
- repeating said deposition and fusion steps several times by applying them to as many corresponding parts of the or each strip, which are offset from one another in a second axis perpendicular to the first axis, such that the fused portions of two of said parts following one another in the second axis overlap, so that all of the fused portions that are obtained after having repeated the deposition and fusion steps relative to the strip(s) jointly form a two-dimensional section of the object to be manufactured.

The invention also relates to a facility for manufacturing a three-dimensional object, including a device suitable for producing, one after the other, planar layers such that each layer newly produced by the device is superimposed, along a first axis that is perpendicular to the respective planes of the layers, on a layer previously produced or, if the latter is not present, a planar metal support that is perpendicular to the first axis, each of the layers made by the device being made up of at least one metal strip such that the or each strip of each layer occupies the entire thickness, along the axis, of the corresponding layer, the device comprising:

deposition means that are suitable for pressing, along the axis, part of the strip of a layer to be produced in contact against the layer previously produced or, if the latter is not present, against the support;

fusion means that are suitable for fusion welding, on the layer previously produced or, if the latter is not present, the support, only a portion, called fused, of the part, pressed by the deposition means, of the strip of a layer to be produced such that, after application of the fusion means, the rest of said part, which has not been fused, includes the edges of said part, arranged transversely to the plane of the layer to be produced, and is still in contact with the layer previously produced or, if the latter is not present, the support; and movement means that are suitable for moving, in a second axis that is perpendicular to the first axis, with respect to one another, the strip of a layer to be produced on the one hand and the deposition means and the fusion means on the other hand, so as to make it possible to apply the deposition means and the fusion means to several corresponding parts of the strip that are offset from one another in the second axis.

This facility makes it possible to carry out the aforementioned manufacturing method.

Thus, the manufacturing method according to the invention consists of manufacturing a three-dimensional object, iteratively layer after layer, by providing, for each layer, for depositing one or several metal strips, then welding this or these strips, the welding operations for example being able to be done by applying a laser beam and/or by resistance. In order to meet the finishing requirements if applicable, the method according to the invention is advantageously completed by operations for partial material removal, by abrasion, machining or laser ablation, as explained in more detail in the later descriptive section.

One important feature of the method according to the invention consists of depositing and welding a strip progressively and iteratively, in particular using a laser and/or an electrode for resistance welding. The gradual and iterative fusing of the strip is provided to monitor and retain the physicochemical characteristics thereof, in particular the geometric characteristics of the deposited metal. The repeated deposition and welding of the strip(s) of a given layer result in producing a two-dimensional, homogeneous section with a dense core of the three-dimensional object to be manufactured, this layer having a thickness corresponding to that of the strip or juxtaposed strips of this layer, this thickness for example being comprised between 10 and 500 μm for one preferred embodiment. For productivity reasons, in combination with an appropriate fusion power, in particular an appropriate laser power, strips having a greater thickness, for example of 1 mm, or even reaching 2 mm, can be used.

To clearly understand one essential aspect of the invention, it will be noted that a large number of recharging methods by fusion with a laser beam and/or an electrode are known: these welding methods are used in the industry for welding and/or recharging, in particular for the repair of mechanical parts with, if needed, post-welding resumption of machining. In these known welding methods, the electrode or the laser beam used fuses the entirety of a section of a metal wire making up a filling metal. This filler metal method by fusion of a wire does not make it possible to control the geometry of the volume of fused material, since an entire section of material is fused. In other words, this total fusion phenomenon does not make it possible to develop a controlled geometry without systematic resumption of machining in order to reconstruct the aforementioned geometry at each moment. Yet it will be kept in mind that manufacturing a three-dimensional object by adding material is based on an iterative principle of solidifying a quantity of material, typically powdered, in the form of a layer most of the time, making up a geometric reference for the manufacture of the following layer. Each solidified layer corresponds to a section of a three-dimensional object to be manufactured. As a result, controlling the geometry of a layer of solidified material making up part of a three-dimensional object to be manufactured is essential for compliant manufacturing of that object: if this is not the case, the entire geometry of the object to be manufactured is noncompliant, i.e., the three-dimensional object as a whole. Given, for the aforementioned known welding methods, the lack of control at each moment over the geometry of a fused and deposited metal, it would be very restrictive and non-profitable to use these methods to completely manufacture parts by adding material.

In the case of the present invention, the manufacturing method makes it possible to produce parts by adding material in the solid state, by using a strip of metal material. In practice, such a strip is a band of material, generally with a rectangular cross-section, such that, in order to produce a new layer of an object to be manufactured, the invention provides for welding, without filler and only partial, of the strip(s) of the layer, by partial fusion of this or these strips after they are deposited on a metal substrate, the latter being the layer previously produced or, if the latter is not present, an ad hoc metal support: according to the invention, in particular under the effect of the laser beam or a resistance welding electrode, only a portion of the part of the or each strip, pressed on the substrate, is fused and welded with the substrate, while taking care to make sure that the rest of this part, which has not been fused, retains the edge geometry of this part and remains bearing against the substrate.

The method according to the invention is intended for all manufacturing sectors, both for use in a unitary production mode for a three-dimensional object, and for use in an industrial mode for the production of small, medium and large series. This method offers the possibility of producing three-dimensional objects made from metal, metal mono- or multi-materials, and using dimensional and geometric finishing levels of type "Quality 7" and with a surface roughness Ra of about 1.6 or even 0.8 for pre-identified functional surfaces of the three-dimensional object to be manufactured.

According to additional advantageous features of the manufacturing method and/or facility according to the invention:

The layer to be produced is made up of several strips, each deposition step relative to a second of the strips:
is carried out while a first of the strips is stationary relative to the layer previously produced or, if the latter is not present, to the support, and
provides, throughout its entire duration, for placing the respective lateral edges of the first and second strips in contact with one another along a third axis that is perpendicular to both the first axis and the second axis,
and, at the end of or during the fusion steps relative to the second strip, the respective lateral edges of the first and second strips are welded by fusion both to the layer previously produced or, if the latter is not present, to the support, and to one another by connecting the corresponding fused portions of the first and second strips.

The deposition steps relative to the second strip are carried out at the end of at least some, or even all of the deposition and fusion steps relative to the first strip.

At least two strips of a same layer or two superimposed strips have different respective chemical compositions from one another.

At least two strips of a same layer or two superimposed strips have different thicknesses from one another and/or different widths from one another.

The method further provides, to produce at least one of the layers, for carrying out a cutting step, which is carried out after having repeated the deposition and fusion steps relative to the layer in question, and during which the strip(s) of the layer in question are cut on the peripheral border of their fused portions, along a corresponding contour of the object.

The method further provides, to produce at least one of the layers, for carrying out a grinding step, which is carried out after having repeated the deposition and fusion steps relative to the layer in question, and during which the face of the strip(s) of the layer in question, which is turned, along the axis, away from the layer previously produced or, if the latter is not present, away from the support, is flattened by removing material.

After having produced each layer and before producing the following layer, the angular orientation, around the first axis, of the layer to be produced is modified relative to that of the layer previously produced.

After having produced at least several of the layers, the peripheral border of at least some of the produced layers is machined transversely to the first axis, in particular by micro-machining.

A beam of a laser is applied on the strip(s) of each layer to be produced to carry out at least some, or even all of the fusion steps, as well as, if applicable, at least some, or even all of said cutting steps and/or said grinding steps and/or the welding operations of the respective lateral edges of said first and second strips.

At least one resistance welding electrode is applied on the strip(s) of each layer to be produced to carry out at least some, or even all of the fusion steps as well as, if applicable, at least some, or even all of the welding operations of the respective lateral edges of said first and second strips.

The fusion means comprise a laser.

The fusion means comprise at least one resistance welding electrode.

The invention will be better understood upon reading the following description, provided solely as an example and done in reference to the drawings, in which:

FIG. 9 is a view similar to FIG. 7, illustrating the result of the repetition of several deposition and fusion steps of the method;

FIGS. 10 to 13 are views similar to FIGS. 4, 7 and 9, illustrating deposition and fusion steps of the method, subsequent to those shown thus far;

Figure 27:
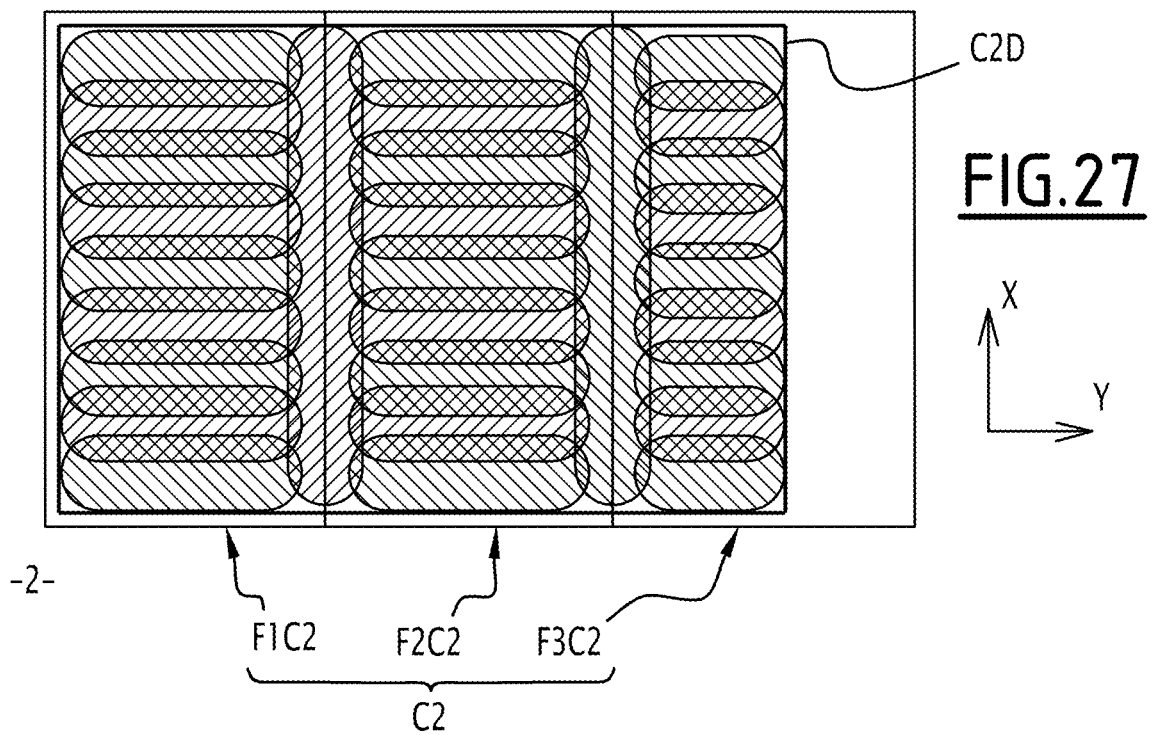
FIGS. 27 and 28 are views respectively similar to FIGS. 15 and 16, illustrating the implementation of a cutting step of the method for the layer superimposed on that of FIG. 19.
Figure 28:
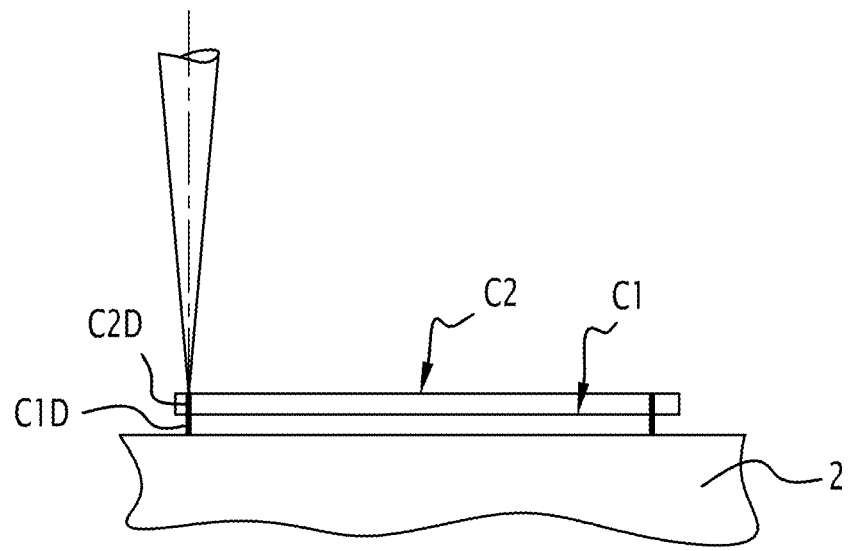
Figure 31:
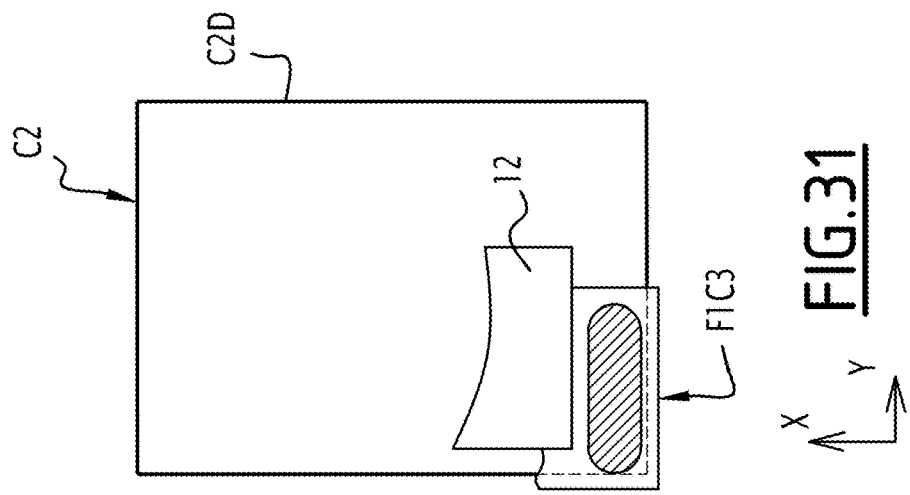
FIGS. 30 to 33 are views similar to FIGS. 4, 7, 10 to 13 and 20 to 26, illustrating the production of a layer superimposed on that shown in FIG. 29.
Figure 29:
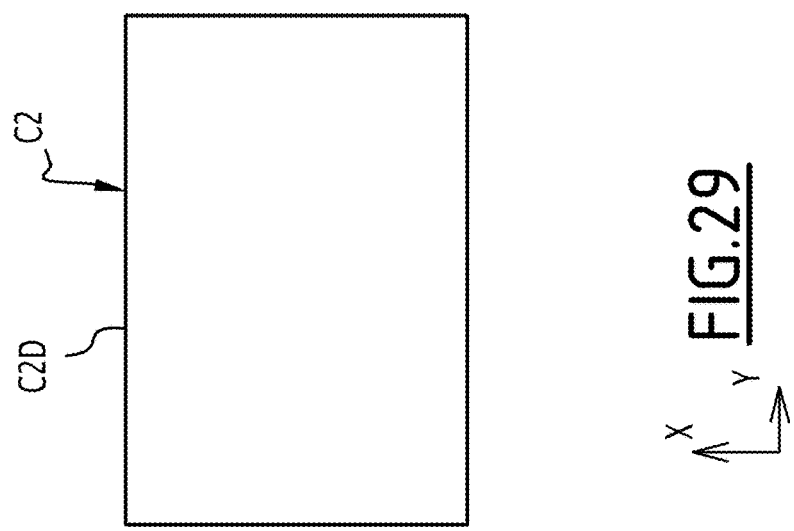
FIG. 29 is a view similar to FIG. 19, showing the layer resulting from the implementation of the steps illustrated by FIGS. 20 to 28.
Figure 33:
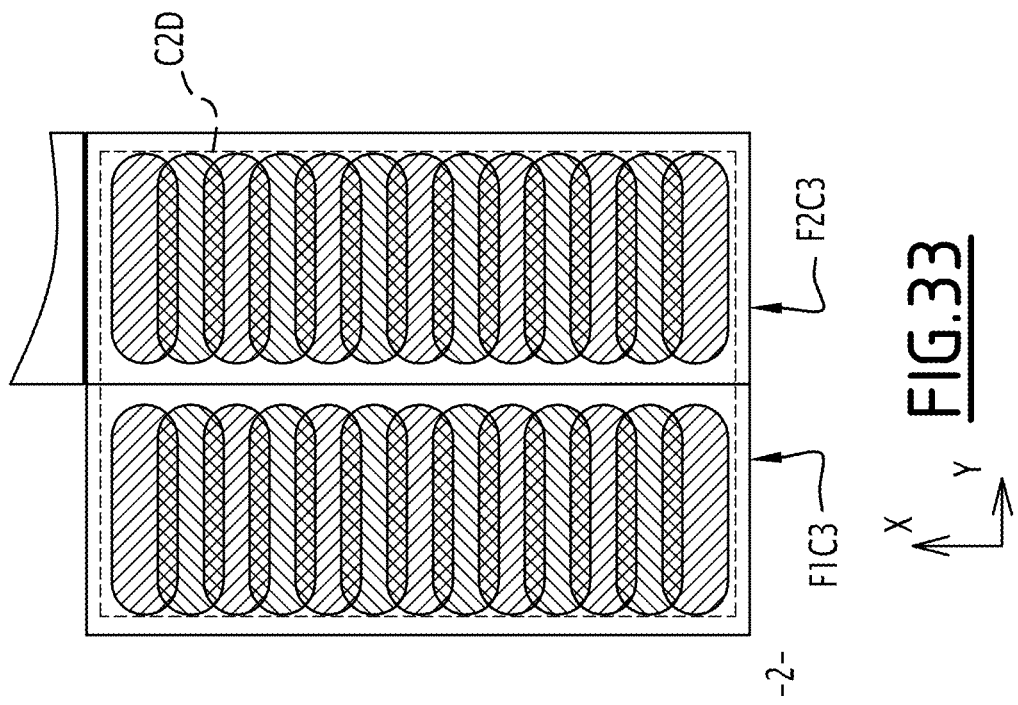
Figure 32:
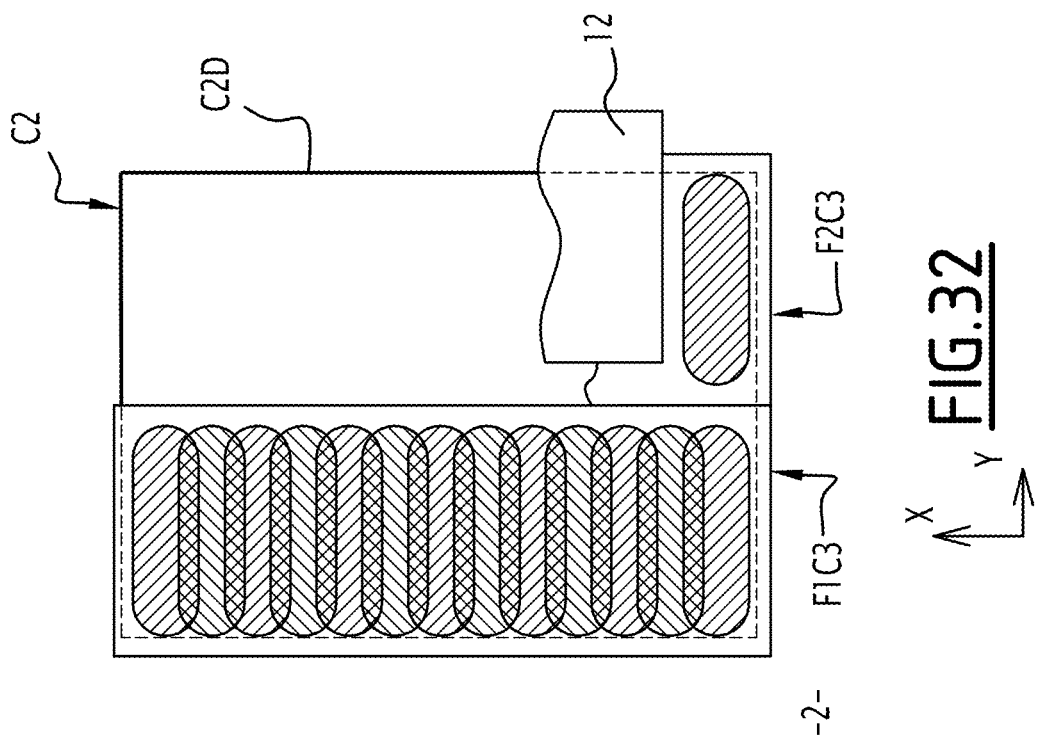
Figure 35:
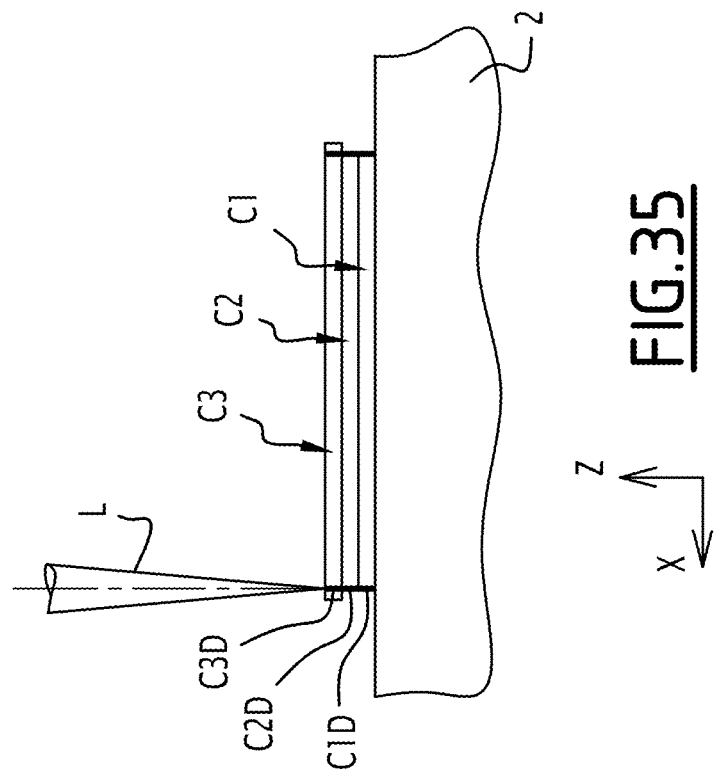
Figure 34:
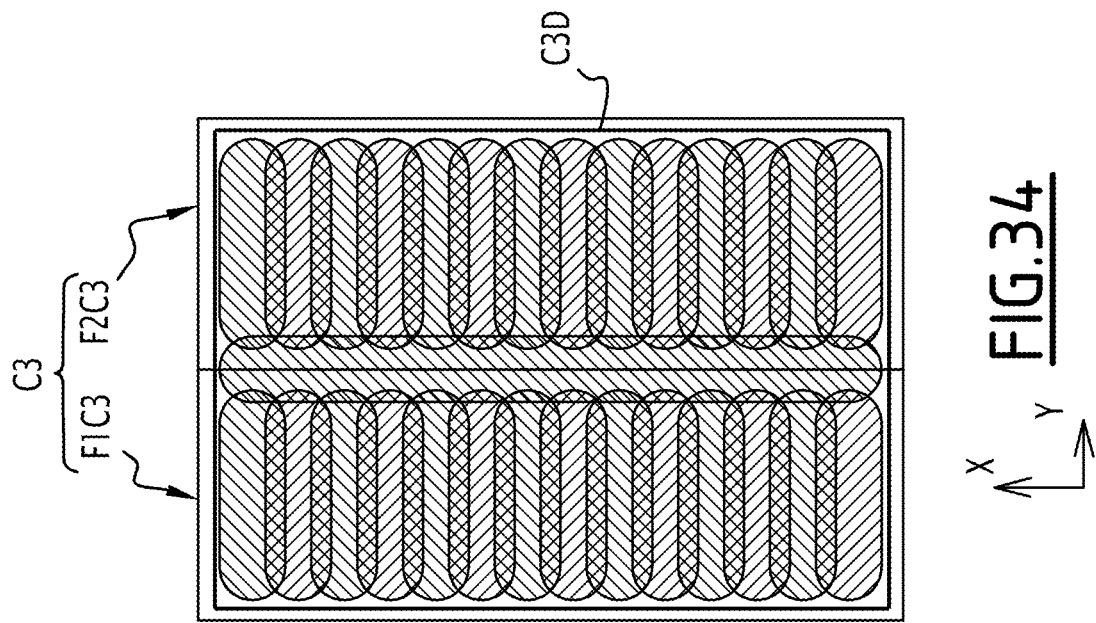
Figure 37:
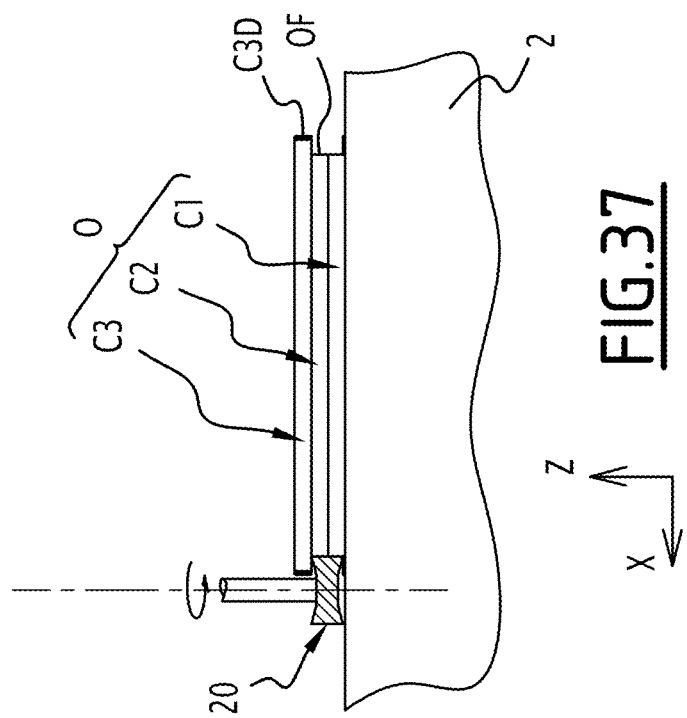
Figure 36:
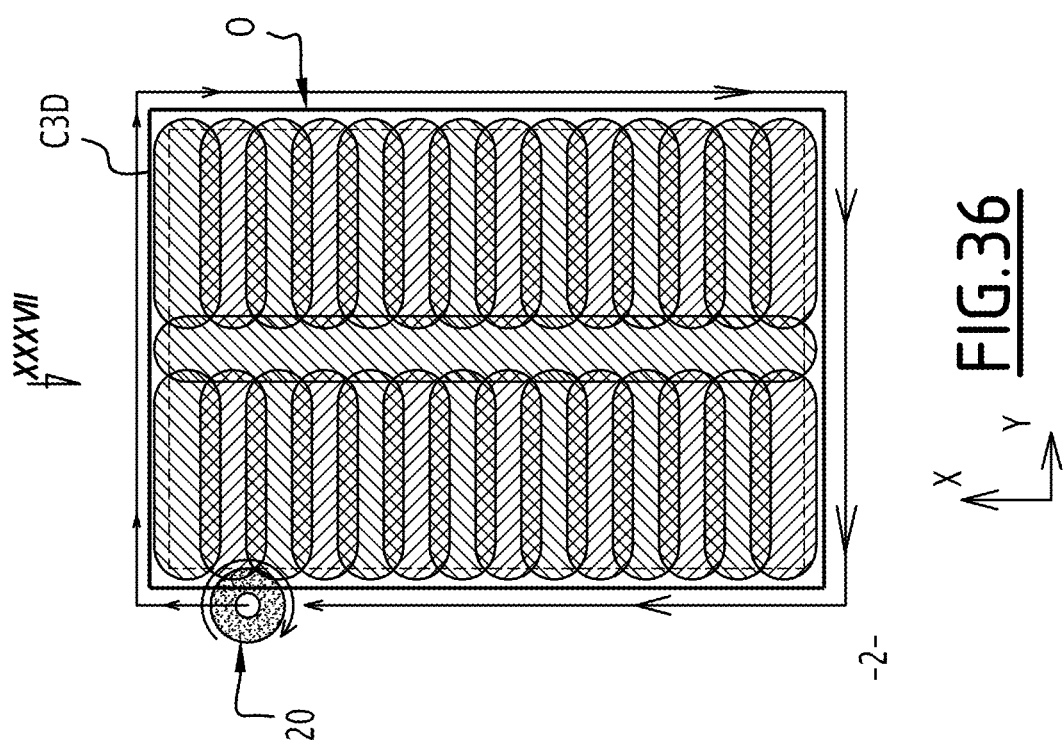

FIGS. 34 and 35 are views respectively similar to FIGS. 15 and 16 or 27 and 28, illustrating the implementation of a cutting step of the method for the layer superimposed on that of FIG. 29;

FIG. 36 is a view similar to FIG. 34, illustrating a machining operation of the method; and FIG. 37 is an elevation view along arrow XXXVII of FIG. 36.

FIGS. 1 to 37 show a method for additive manufacturing of a three-dimensional object O. In the example embodiment considered in these figures, this manufacturing method is carried out via a manufacturing facility 1.

Figure 1:
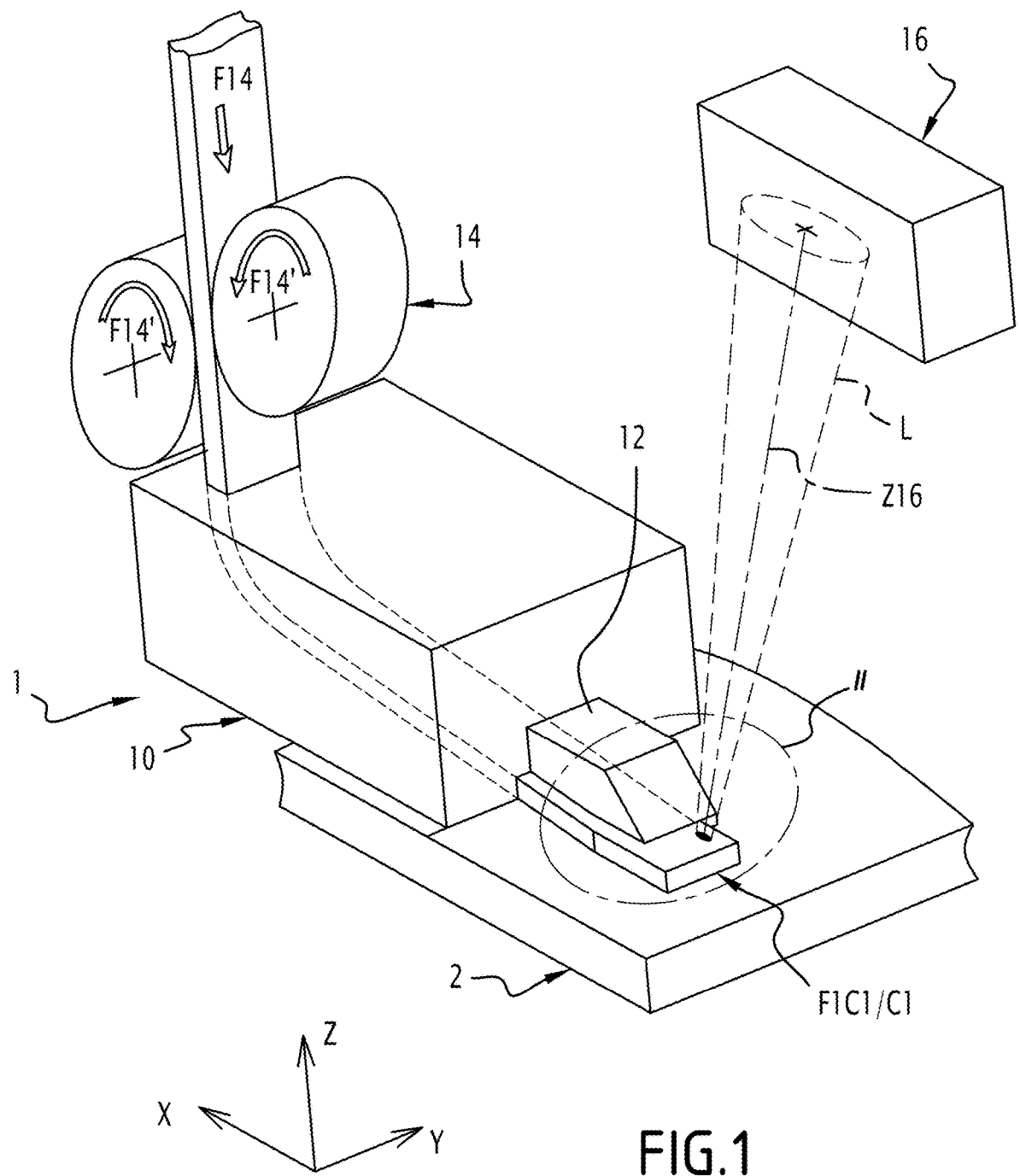
FIG. 1 is a schematic perspective view of a manufacturing facility according to the invention, implementing a first deposition step of the manufacturing method according to the invention.
Figure 2:
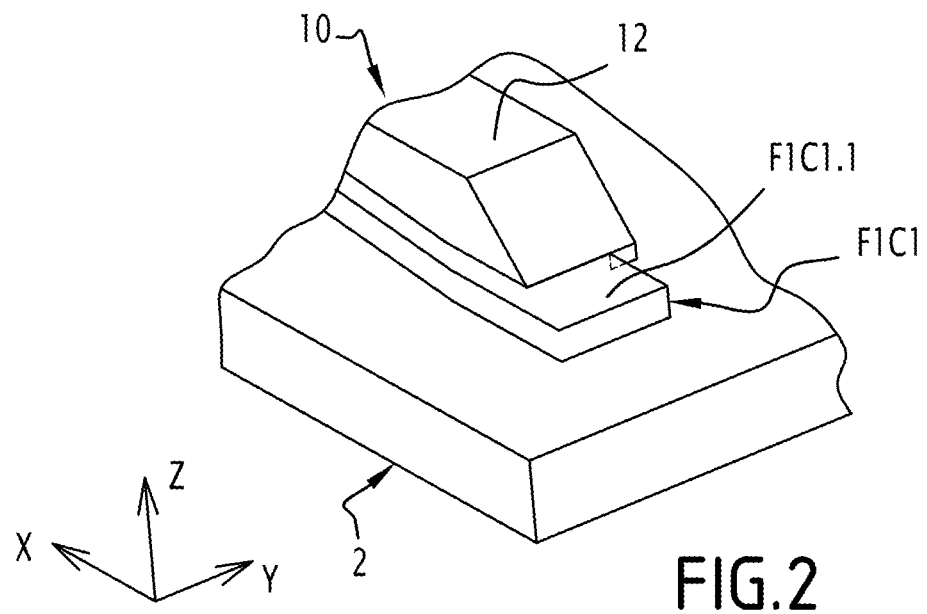
FIG. 2 is an enlarged view of circled detail II in FIG. 1.

As shown in more detail in FIGS. 1 and 2, the facility 1 includes a device 10 designed to produce superimposed flat layers, making up the object O to be manufactured, each layer newly produced by the device 10 being superimposed, along a geometric axis Z that is perpendicular to the respective planes of the layers, to a layer previously produced or, if the latter is not present, to a flat metal support 2 that is perpendicular to the axis Z-Z. In the continuation of the present description, and in the figures, the axis Z is considered to extend vertically, but this orientation is not limiting with respect to the invention.

As explained progressively hereinafter, each layer of the object O, made by the device 10, is formed from metal strips, which are juxtaposed in the plane of the layer in question, each occupying the entire thickness of this layer, i.e., the entire dimension of the latter along the axis Z. In practice, each of these strips assumes the form of a metal band, which has a rectangular cross-section and the thickness of which is much smaller than its other two dimensions, while typically being at least around five to ten times smaller than its width and in particular being equal to between 5 µm and 2 mm, preferably between 10 µm and 1 mm. Before their use by the facility 1 in order to manufacture the object O, these strips are for example made available in the form of one or several windings, all or part of the strips that are not yet individualized being able to be in the form of a long shared band. The aforementioned windings and, more generally, the aforementioned strips are inexpensive commercially available products, generally manufactured by rolling and available in a very wide variety of metallurgical grades.

In FIGS. 1 to 19, the facility 1, in particular its device 10, is, as explained in more detail below, used to produce a first layer C1 of the object O. More specifically, in FIGS. 1 to 9, the device 10 is used to produce a part of the layer C1 from a first strip, referenced F1C1. To that end, a first deposition step is carried out, by which the strip F1C1 is deposited on the support 2, as shown in FIGS. 1 and 2. To that end, in the example embodiment considered in the figures, the device 10 comprises a nozzle 12 for guiding and positioning the strip F1C1: at the output of this nozzle 12, a terminal longitudinal part F1C1.1 of the strip F1C1, which emerges from the nozzle 12 along a geometric axis X perpendicular to the axis Z, is arranged in planar contact with the support 2, perpendicular to the axis Z. Thus, under the action of the nozzle 12, the longitudinal direction of the strip F1C1 extends, at least in line with its terminal part F1C1.1, along the axis X and the two main faces of the strip F1C1, which are opposite one another and between which the thickness of the strip is defined, extending, at least in line with the terminal part F1C1.1, perpendicular to the axis Z. Consequently, the main face of the strip turned toward the support 2 extends, at least at the terminal part F1C1.1, in a geometric plane that is substantially combined with the geometric plane in which the planar face extends, turned toward the nozzle 12, of the support 2.

According to one practical advantageous arrangement, the device 10 also comprises an intake system 14 of the strip F1C1, which is designed to drive the strip in the longitudinal direction of the latter, at least in the insertion direction of the strip at the inlet of the nozzle 12, as indicated by arrow F14 in FIG. 1. As a non-limiting example, which is shown in FIG. 1, this system 14 includes motorized rotary rollers, which are arranged tangentially respectively against the opposite main faces of the strip F1C1 and the rotation of which around themselves, indicated by the arrows F14' in FIG. 1, sets the strip in motion in its longitudinal direction.

Furthermore, the device 10 incorporates precision guide elements, in particular linear guides, as well as fine driving mechanisms, such as ball screw and nut systems, driven by motors, in particular of the brushless type. These guide elements and drive mechanisms, which are not shown in the figures, make it possible to position the device 10, in particular its nozzle 12, simultaneously along the axis Z, the axis X and a third geometric axis Y perpendicular to the axes Z and X. In practice, owing to their guiding precision and fine driving, the aforementioned guide elements and drive mechanisms guarantee positioning repeatability of several micrometers of error, as well as movement speed control repeatability. If applicable, the action of the intake system 14 is synchronized with the movement along the axis X of the device 10, in particular of its nozzle 12. Thus, the positioning precision of the strip F1C1 by the device 10 is preferably comprised between 5 and 10 μm along all three axes X, Y and Z.

Figure 3:
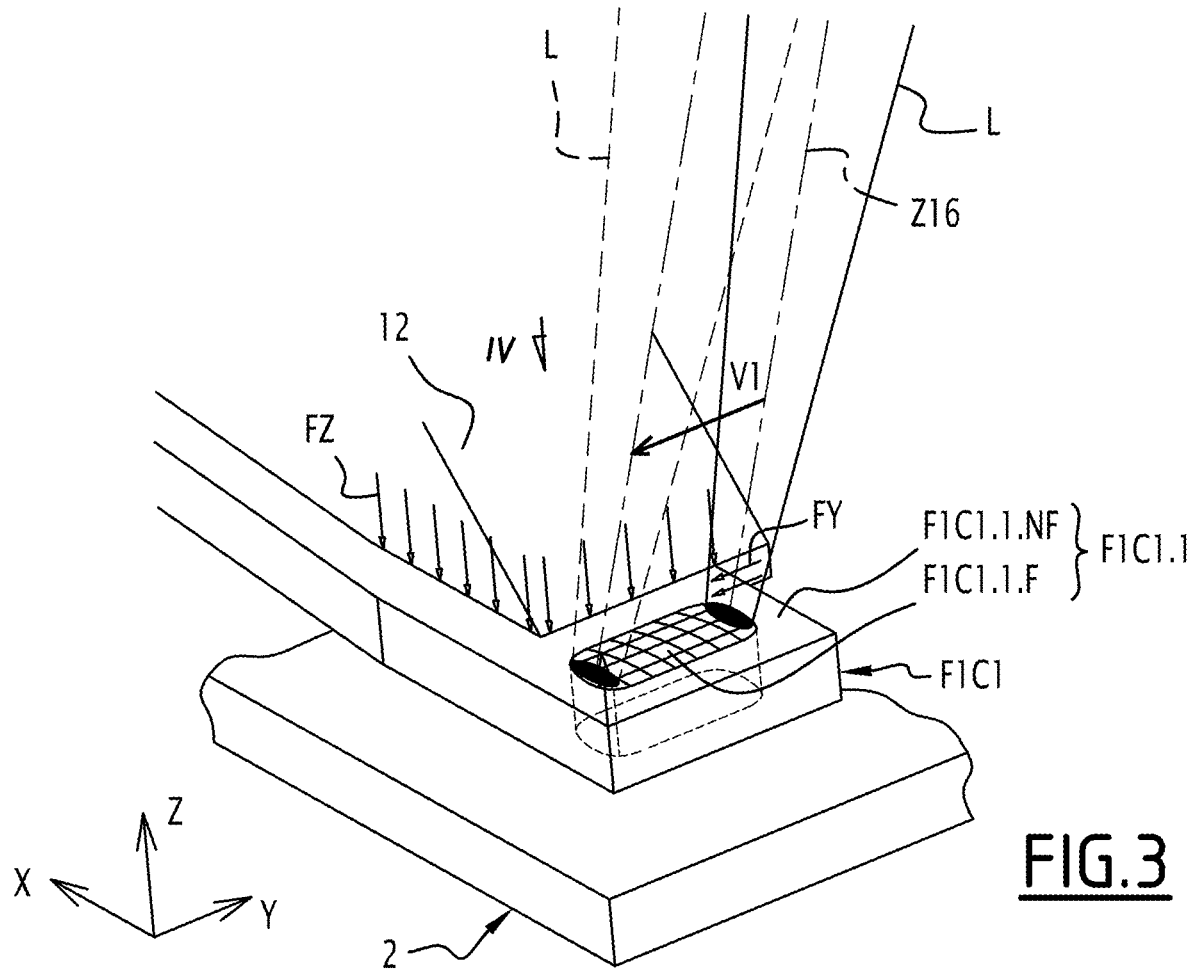
FIG. 3 is a view similar to FIG. 2, showing the implementation of a first fusion step of the manufacturing method.
Figure 4:
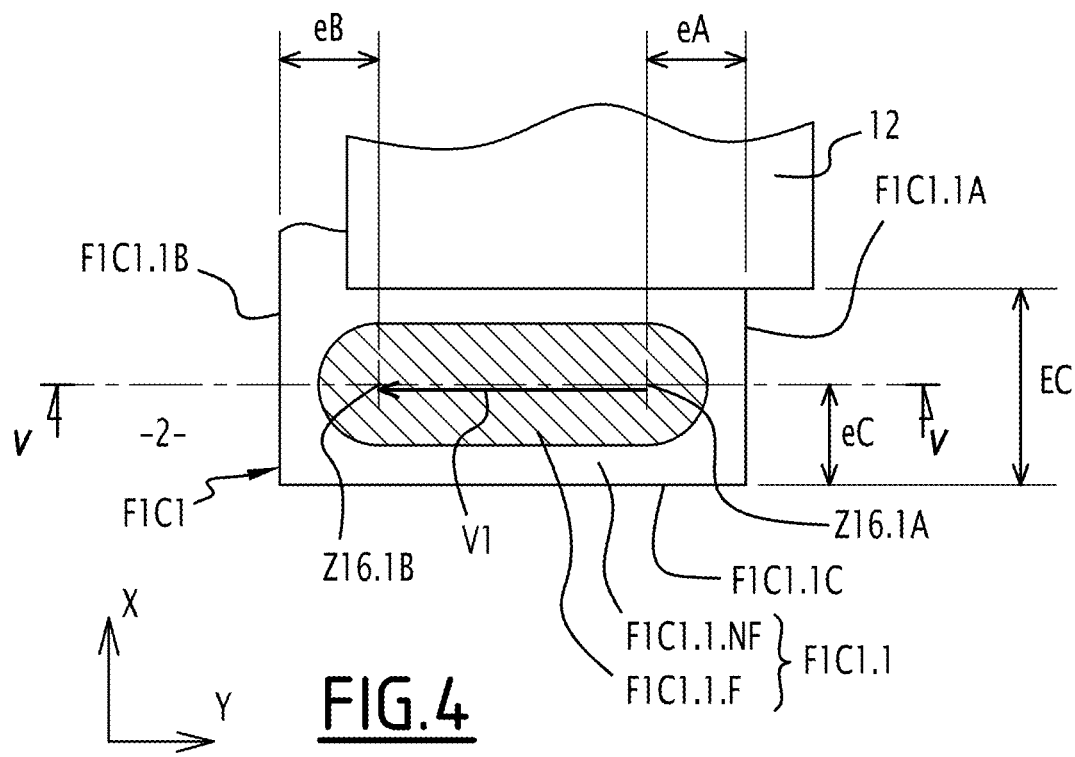
FIG. 4 is an elevation view along arrow IV in FIG. 3.
Figure 5:
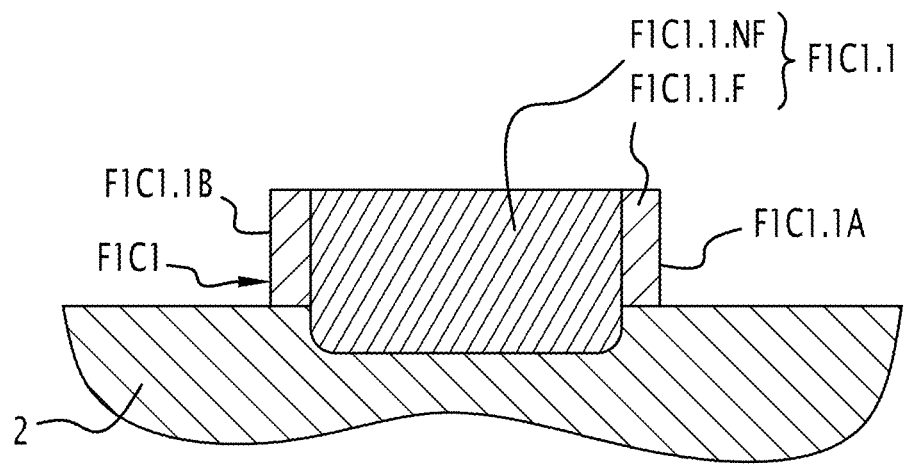
FIG. 5 is a sectional view along line V-V of FIG. 4.

At the beginning of the implementation of the first deposition step, the device 10, in particular its nozzle 12 and its intake system 14, is, owing to the arrangements described above, controlled in terms of position such that:

along the axis Z, the nozzle 14 applies, on the part of the strip F1C1 with which this nozzle is in contact, a force FZ, which, as illustrated in FIG. 3, is oriented toward the support 2, such that the terminal part F1C1.1 of the strip F1C1 is pressed, along the axis Z, in contact against the support 2 with a predetermined minimal intensity so as to provide complete planar contact between the faces, turned toward one another along the axis Z, respectively of the part F1C1.1 of the strip F1C1 and the support 2;

along the axis Y, the nozzle 12 applies, to the part of the strip F1C1 with which this nozzle is in contact, a force FY, which is shown schematically in FIG. 3 and which is independent of the force FZ, so as to position, along the axis Y, the part F1C1.1 of the strip F1C1, in particular the two opposite free edges F1C1.1A and F1C1.1B of the latter, arranged perpendicular to the axis Y and referenced in FIGS. 4 and 5; and along the axis X, the part F1C1.1 of the strip F1C1 is positioned in a predetermined manner, in particular with its free edge F1C1.1C, arranged perpendicular to the axis X, which is separated from the nozzle 12 by a value EC indicated in FIG. 4.

The positioning and the bearing of the part F1C1.1 of the strip F1C1 on the support 2, specified just above, are maintained throughout the entire duration of the first deposition step.

Furthermore, during the first deposition step, a laser beam L is applied to the part F1C1.1 of the strip F1C1 so as to fuse it only partially and thus to weld it to the support 2. To that end, the device 10 comprises a laser 16, shown schematically in FIG. 1, which is designed to emit the laser beam L, centering it on an axis Z16, and to move this laser beam L in space, by corresponding movement of its axis Z16.

The laser 16 is part of a technology known in itself: it is for example a fiber laser. The wavelength, continuous or modulated, of the laser beam L is suitable for the metallurgical grade of the strip to be fused: as non-limiting examples, this radiation is chosen in the infrared, typically between 1060 and 1080 nm, when the strips are iron-based, in particular steel-based or aluminum-based, or have a base of other metal materials absorbing this type of radiation, while this wavelength is more suitable with a so-called green radiation, typically comprised between 520 and 532 nm, when the strips have a base of copper or some of its alloys. More generally, the wavelength of the laser 16 is suitable for satisfying feasibility and productivity objectives.

Within the manufacturing facility 1, the laser 16 is provided to orient the axis Z16 of its laser beam L parallel to the axis Z and to move this axis Z16 parallel to the axis Y, while controlling the precision of the positioning of this axis Z16 in space, in particular with respect to the part F1C1.1 of the strip F1C1 to which this laser beam L is applied during a first fusion step, carried out during the first deposition step. More specifically, as shown in FIGS. 3 to 5, throughout the entire first fusion step, the axis Z16 of the laser beam L intersects the part F1C1.1 of the strip F1C1 by going, at the beginning of the first fusion step, from a position Z16.1A, to, at the end of the first fusion step, a position Z16.1 B. The two positions Z16.1A and Z16.1B are aligned along the axis Y and respectively constitute the origin and the end of a vector V1 along which the axis Z16 of the laser beam L is moved between the beginning and the end of the fusion step. The position Z16.1A, which is closer to the edge F1C1.1A of the part F1.C1.1 of the strip F1C1 than the edge F1C1.1B, is arranged, on the one hand, along the axis Y, at a non-nil distance from the edge F1C1.1A, equal to eA, and on the other hand, along the axis X, at a non-nil distance from the edge F1C1.1C of the part F1C1.1 of the strip F1C1, equal to eC. It will be understood that, along the axis X, the position Z16.1A is located at a distance from the nozzle 12, corresponding to the difference between the values EC and eC, this distance being provided to be as small as possible, while avoiding the interaction between the laser beam L and the nozzle 12, for example being about 200 μm, such that the fusion welding, done by applying the laser beam L, is done as close as possible to the mechanical bearing action of the nozzle 12 on the strip F1C1 along the axis Z. The location along the axis X of the position Z16.1B is identical to that of the position Z16.1A, because the vector V1 extends parallel to the axis Y, while along the axis Y, the position Z16.1B is located at a non-nil distance from the edge F1C1.1B of the part F1C1.1 of the strip F1C1, equal to eB. According to one specific alternative embodiment, which is not shown, and if applicable along a specific strip F1C1 width, the positions of Z16.1A and Z16.1B can be combined; this may for example be the case for a thin strip.

During the implementation of the first fusion step, the laser beam L fuses only a portion F1C1.1.F of the part F1C1.1 of the strip F1C1, by transparency welding of this portion F1C1.1.F to the support 2, as shown in FIG. 5. Since this welding is done as close as possible to the bearing force FZ of the nozzle 12 on the strip F1C1, a metallurgical continuity is provided between the fused portion F1C1.1.F of the strip and the support 2. Furthermore, the values eA, eB and eC, relative to the positions Z16.1A and Z16.1B of the axis Z16 of the laser beam L moved along the vector V1, are provided to respect two limit conditions, namely that:

- these values eA, eC and eB are large enough for the interaction of the laser beam L with the part F1C1.1 of the strip F1C1 not to merge with the edges F1C1.1A, F1C1.1 and F1C1.1C, so as not to assume the enclosure geometry, in other words the edges, of the part F1C1.1, and
- these values eA, eB and eC are small enough for the non-fused portion F1C1.1.NF of the part F1C1.1, which surrounds the fused part F1C1.F in the plane of the axes X and Y, not to deform, in particular in the direction of the axis Z, which would cause a loss of mechanical and therefore metallurgical contact between the part F1C1.1 of the strip F1C1 and the support 2.

In other words, at the end of the first fusion step, the non-fused portion F1C1.1.NF, which is made up of what was not fused in the part F1C1.1, includes the edges F1C1.1A, F1C1.1B and F1C1.0 of this part F1C1.1 and is still in contact with the support 2.

In practice, in order to satisfy the aforementioned limit conditions, each of the aforementioned values eA, eB and eC may be such that:

(½ thickness of F1C1+½ interaction width of L)<eA, eB, eC<(thickness of F1C1+½ interaction width of L), the aforementioned interaction width corresponding to the dimension, along the axis X, of the laser beam L in the plane occupied by the part F1C1.1 of the strip F1C1.

Of course, the above relationship applies both to eA and eB when the entire width of the deposited strip is used, whereas when the width of the deposited strip is not all used, one of the values eA and eB can be much larger than the other. It should be understood that the above relationship is provided solely for information, since it evolves based on the metallurgical nature of the material of the strip, a certain thickness limit of the strip and the interaction profile of the laser beam L in the thickness of the strip, this interaction profile in turn in particular depending on the quantity of energy produced during the interaction, therefore, in particular, the speed with which the vector V1 is produced, the profile of the laser beam L, etc. In practice, the vector V1 is defined with a set of parameters, so as to obtain, at the end of the first fusion step, both the fused portion F1C1.1.F and the non-fused portion F1C1.1.NF of the part F1C1.1 of the strip F1C1, as defined above, without there being deformation of the portion F1C1.1.NF.

Figure 6:
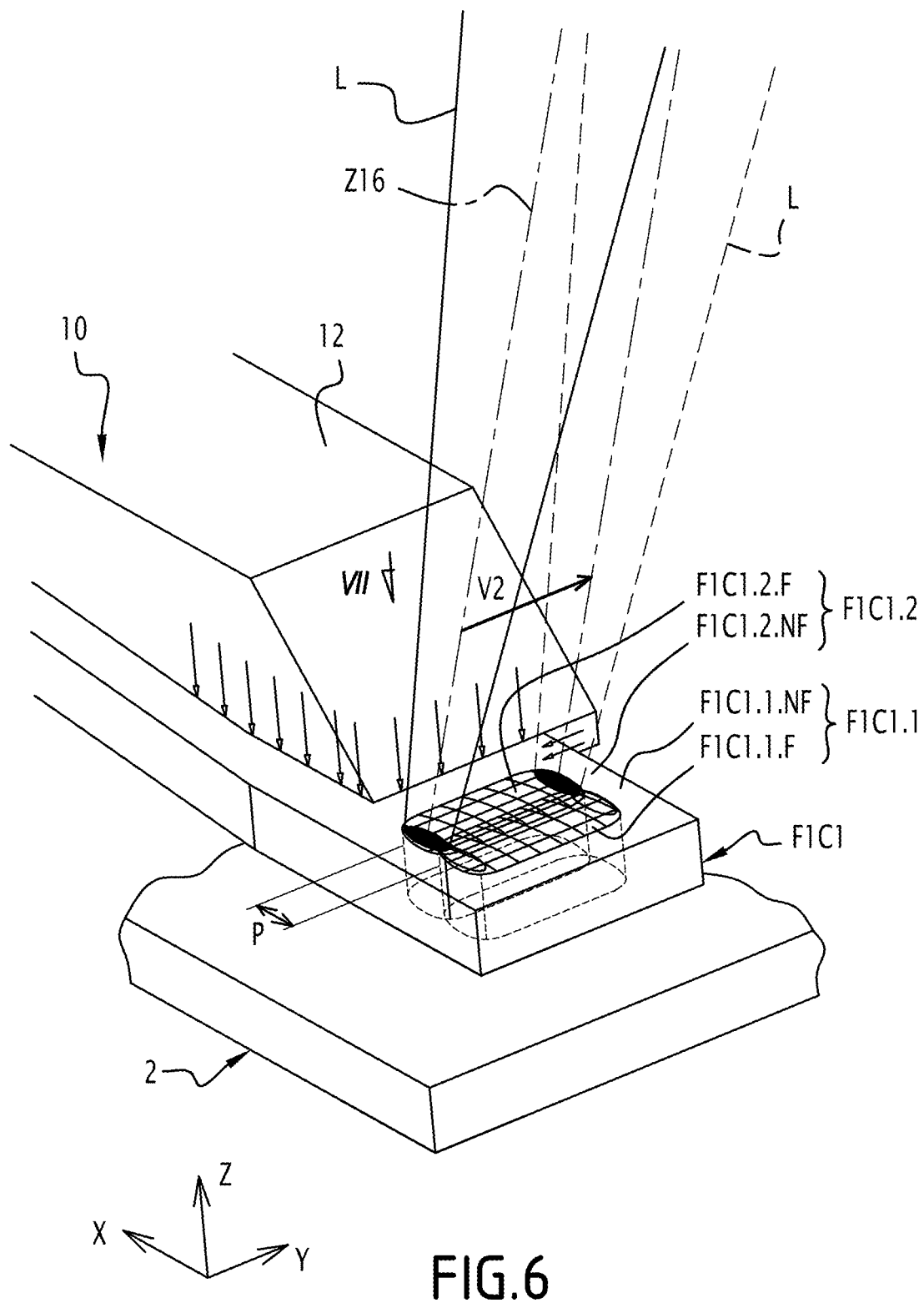
FIG. 6 is a view similar to FIG. 3, illustrating a second fusion step of the method.
Figure 7:
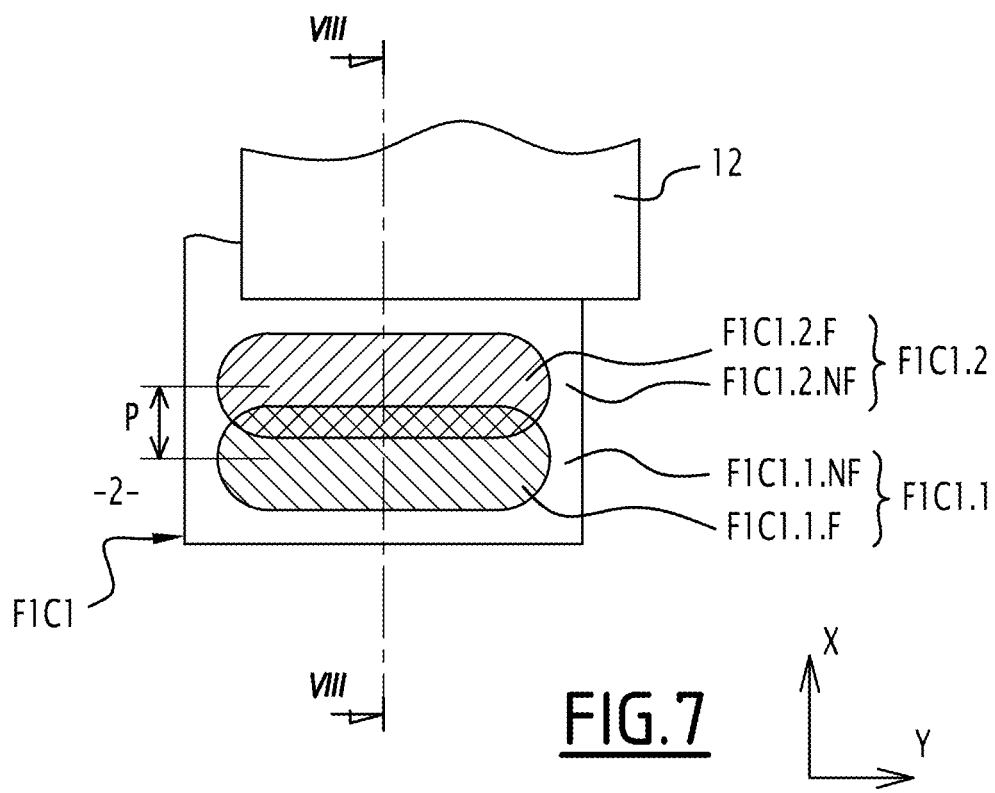
FIG. 7 is an elevation view along arrow VII of FIG. 6.
Figure 8:
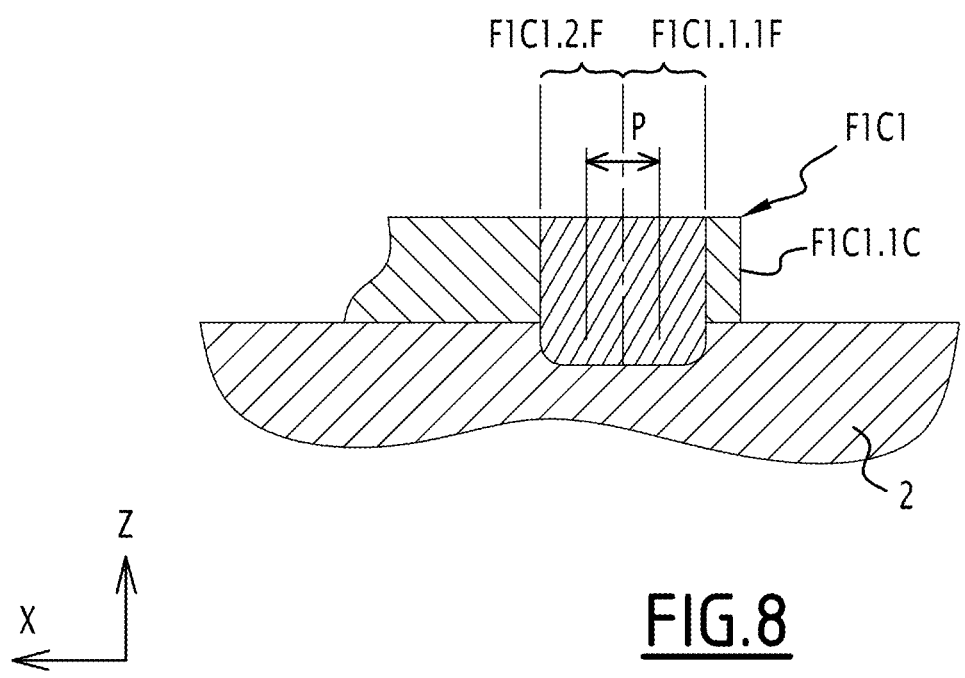
FIG. 8 is a sectional view along line VIII-VIII of FIG. 7.

As shown in FIGS. 6 to 8, a second deposition step and a second fusion step are next carried out by repetition of the first deposition and fusion steps after having moved along the axis X, across from one another, the strip F1C1 on the one hand, and the device 10, in particular its nozzle 12 and the laser 16, on the other hand. In practice, taking account of the fact that the strip F1C1 is welded to the support 2 by the fused portion F1C1.1.F of its part F1C1.1, one practical embodiment consists of moving, along the axis X, the nozzle 12 and the laser 16 relative to the strip F1C1, which remains immobile relative to the support 2, subject to the actuation of the guide elements and drive mechanisms, mentioned above, and subject to the synchronization of the latter with the movement of the laser 16. In all cases, the relative movement is done by one pitch P.

Once this relative movement is done, the implementation of the second deposition and fusion steps consists of repeating the implementation of the first deposition and fusion steps, not by applying these deposition and fusion steps to the part F1C1.1 of the strip F1C1, but by applying them to a second part F1C1.2 of the strip, this part F1C1.2 being offset along the axis X of the part F1C1.1 by the pitch P. By implementing the second deposition step, the part F1C1.2 of the strip F1C1 is pressed, along the axis Z, in contact against the support 2, in the same way that the part F1C1.1 was pressed against the support 2 by the implementation of the first deposition step. Likewise, by implementing the second fusion step, only a portion F1C1.2.F of the part F1C1.2 is welded by fusion to the support 2, in the same way that the fused portion F1C1.1.F had been welded to the support 2 by the implementation of the first fusion step. In particular, during the second fusion and deposition steps, the part F1C1.2 of the strip F1C1, in particular its opposite edges F1C1.2A and F1C1.2B arranged perpendicular to the axis Y, occupy the same relative position with respect to the nozzle 12 and the axis Z16 of the laser beam L that were occupied by the edges F1C1.1A and F1C1.1B of the part F1C1.1 during the first deposition and fusion steps, such that the fused part F1C1.2F corresponds, geometrically, to the fused portion F1C1.1.F but offset along the axis X by the pitch P, according to the present example, namely according to the geometry of the section of the object to be manufactured. The present example is reduced to a simple section of an object to be manufactured of the prismatic type, in order to facilitate the understanding thereof. Thus, the length of V1 depends on the position of the strip F1C1, and in particular the edges F1C1.1A and F1C1.1B. In particular, it will be understood that more generally, the values eA and eB are not necessarily identical.

Likewise, the rest of the part F1C1.2 of the strip F1C1 constitutes a non-fused portion F1C1.2.NF, which, according to considerations similar to those developed above for the non-fused portion F1C1.1.NF of the part F1C1.1, includes the edges F1C1.2A and F1C1.2B of the part F1C1.2 and is kept in planar contact against the support 2, in particular without unsticking along the axis Z.

Furthermore, the value of the pitch P is such that, as clearly visible in FIGS. 6 to 8, the two fused portions F1C1.1.F and F1C1.2.F overlap in the direction of the axis X, while partially covering one another over an expanse, along the axis X, that depends on the pitch P and the corresponding dimension of these fused portions F1C1.1.F and F1C1.2.F. As clearly shown in FIGS. 7 and 8, this overlap makes it possible to constitute a volume of fused material that is homogeneous and without porosity, including across from the fused surface zone of the support 2. In other words, the parts F1C1.1 and F1C1.2 are thus welded, by fusion, continuously both between one another and between the strip F1C1 and the support 2.

According to one optional development seeking to optimize the second fusion step, the movement of the axis Z16 of the laser beam L during this second fusion step may not be done along the vector V1 offset by the pitch P, but along a vector V2 that is equal to the vector V1 offset by the pitch P, but which is oriented in the opposite direction, as indicated schematically in FIG. 6.

A third deposition step and a third fusion step are next repeated after having moved, along the axis X, by the pitch P, the relative position between the strip F1C1 and the device 10, such that these third deposition and fusion steps are applied to a third part of the strip F1C1, offset, along the axis X, by the pitch P with respect to the second part F1C1.2 of the strip; then, a fourth deposition step and a fourth fusion steps are repeated, also after having moved the strip and the device with respect to one another by the pitch P along the axis X; and so forth. More globally, deposition and fusion steps are thus repeated several times, each time applying the deposition step and the fusion step to a corresponding longitudinal part of the strip F1C1, the parts of the strip successively affected being offset from one another along the axis X, each time by the pitch P. As an example, FIG. 9 shows the result of thirteen repetitions of the deposition and fusion steps, with the obtainment of fourteen fused portions, including the portions F1C1.1.F and F1C1.2.F, having noted that for each pair of portions following one another in the axis X, the two portions overlap, like for the portions F1C1.1.F and F1C1.2.F.

In the example embodiment considered here, the method continues by the implementation of a cutting operation of the strip F1C1, parallel to its edge F1C1.1C, but opposite this edge F1C1.0 along the axis X, on the border of the fused portion most recently made, as indicated by the thick line F1C1D in FIG. 9.

In practice, this cutting operation is advantageously done by laser ablation, using the laser 16.

As shown in FIGS. 10 to 13, the method next continues by implementing new deposition and fusion steps and repeating them, applied to a second strip F2C1. The deposition steps and the fusion steps, successively carried out for this strip F2C1, are identical to those carried out for the strip F1C1, the positioning of the device 10 being suitable for its relative positioning with respect to the strip F2C1 to be identical to that which it had with respect to the strip F1C1 during the deposition and fusion steps relative to this strip F1C1. Furthermore, during the implementation of the deposition and fusion steps relative to the strip F2C1, the nozzle 12, under the action of the force FY, presses the strip F2C1 laterally against the strip F1C1 along the axis Y, the strip F1C1 being stationary against the support 2 via the rigid connection between its fused portions and the support 2. In this way, a metallurgical continuity is produced by contact between the strips F1C1 and F2C1, by sealing of their lateral edge perpendicular to the axis Y, across from one another along this axis Y. Thus, in the example embodiment considered in FIGS. 10 to 13, the first terminal longitudinal part F2C1.1 of the strip F2C1, only a portion of which, referenced F2C1.1.F, is welded by fusion during the implementation of the first fusion step relative to the strip F2C1, is, throughout the entire deposition step applied to this part F2C1.1, pressed laterally by the edge F2C1.1 of its non-fused portion F2C1.1.NF against the edge F1C1.1A of the part F1C1.1 of the strip F1C1.

Figure 13:
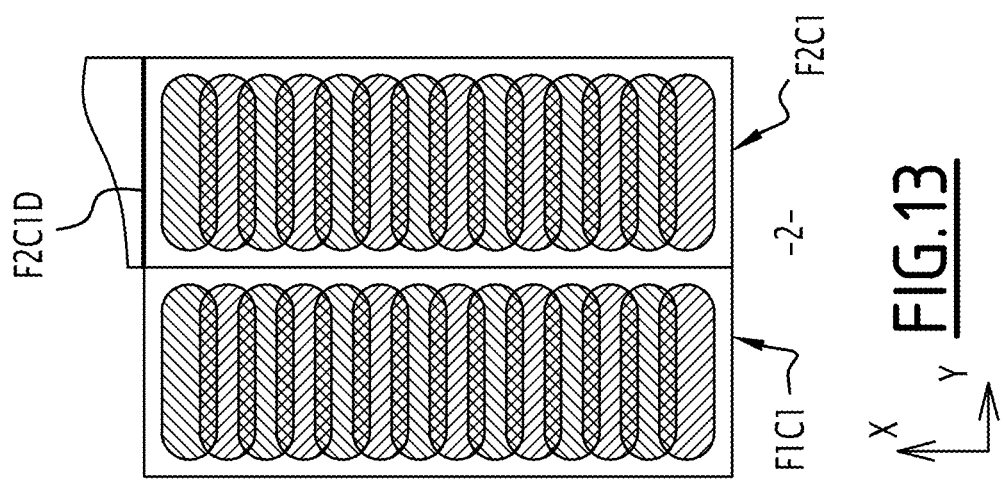
Figure 12:
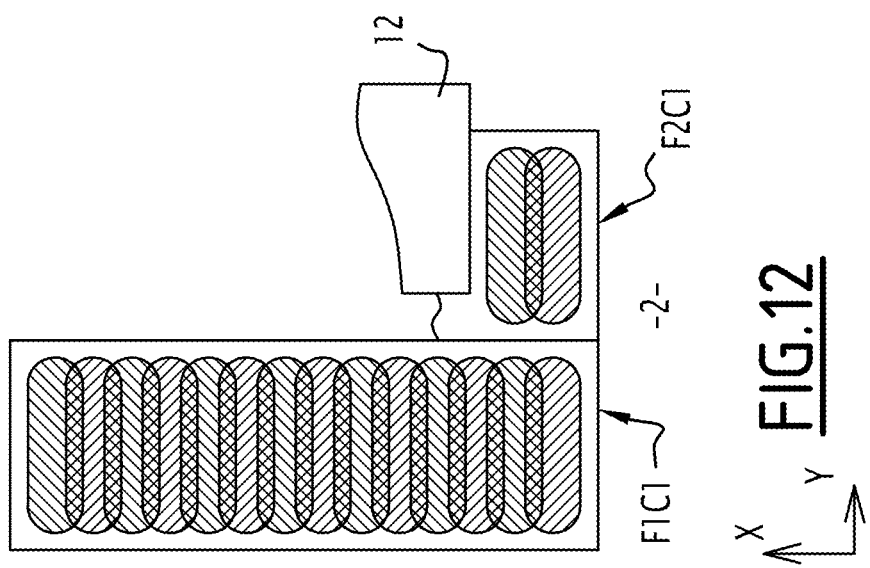

At the end of the last deposition step and the last fusion step, relative to the strip F2C1, the latter is cut in the same manner that the strip F1C1 was in FIG. 9, as indicated by the thick line F2C1D in FIG. 13.

Figure 14:
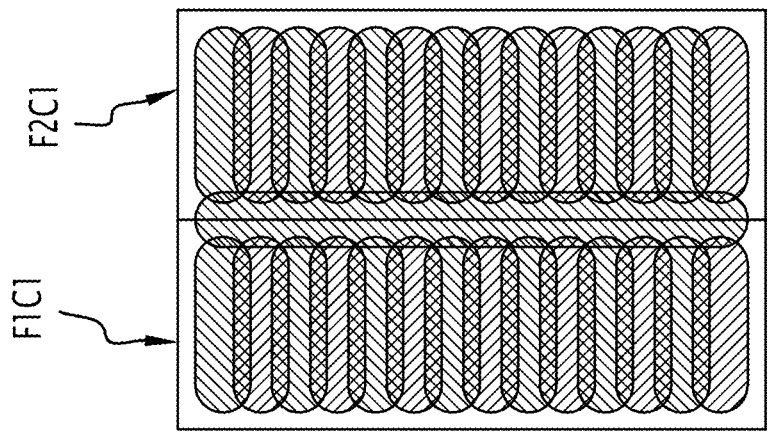
FIG. 14 is a view similar to FIG. 13, illustrating a welding operation of the method.

As shown in FIG. 14, the method next continues by implementing a welding operation along the sealing between the strips F1C1 and F2C1.

Advantageously, using the laser beam L, the respective lateral edges of the strips F1C1 and F2C1, which are in contact with one another along the direction Y, are fusion welded, both to the support 2 and to one another connecting their respective fused portions, as shown in FIG. 14. At the end of this welding operation, a metallurgical continuity is provided between the respective fused portions of the strips F1C1 and F2C1, as well as with the support 2. All of these fused portions jointly form a two-dimensional section of the object O to be manufactured, namely its two-dimensional section at the layer C1, this section thus being obtained to be dense and homogeneous in its core.

Figure 15:
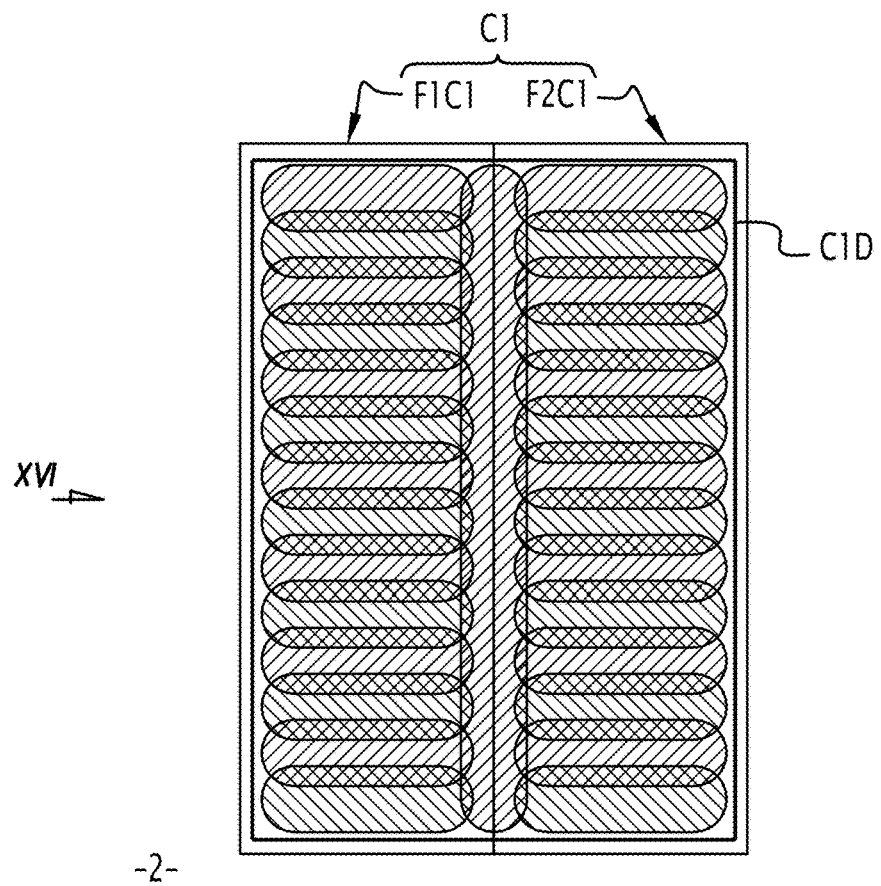
FIG. 15 is a view similar to FIG. 14, illustrating a cutting step of the method.
Figure 16:
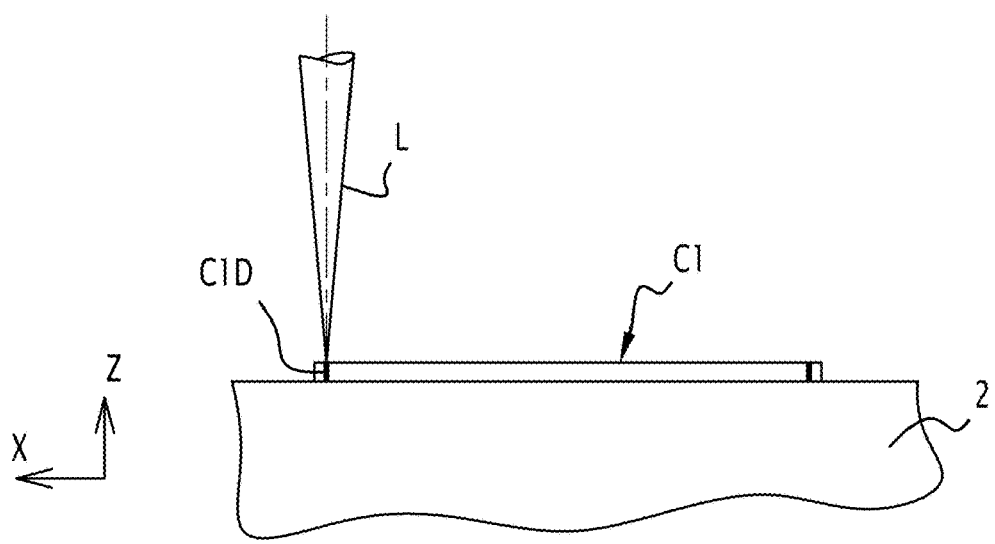
FIG. 16 is an elevation view along arrow XVI of FIG. 15.
Figure 17:
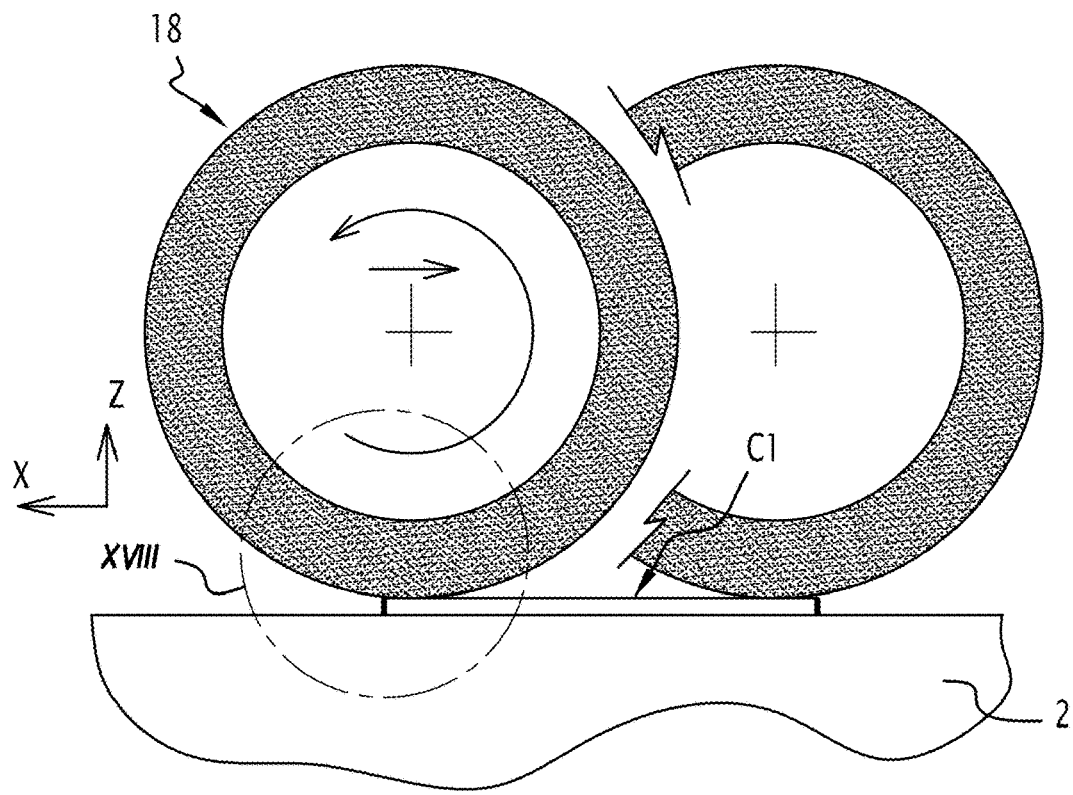
FIG. 17 is a view similar to FIG. 16, illustrating a grinding step of the method.
Figure 18:
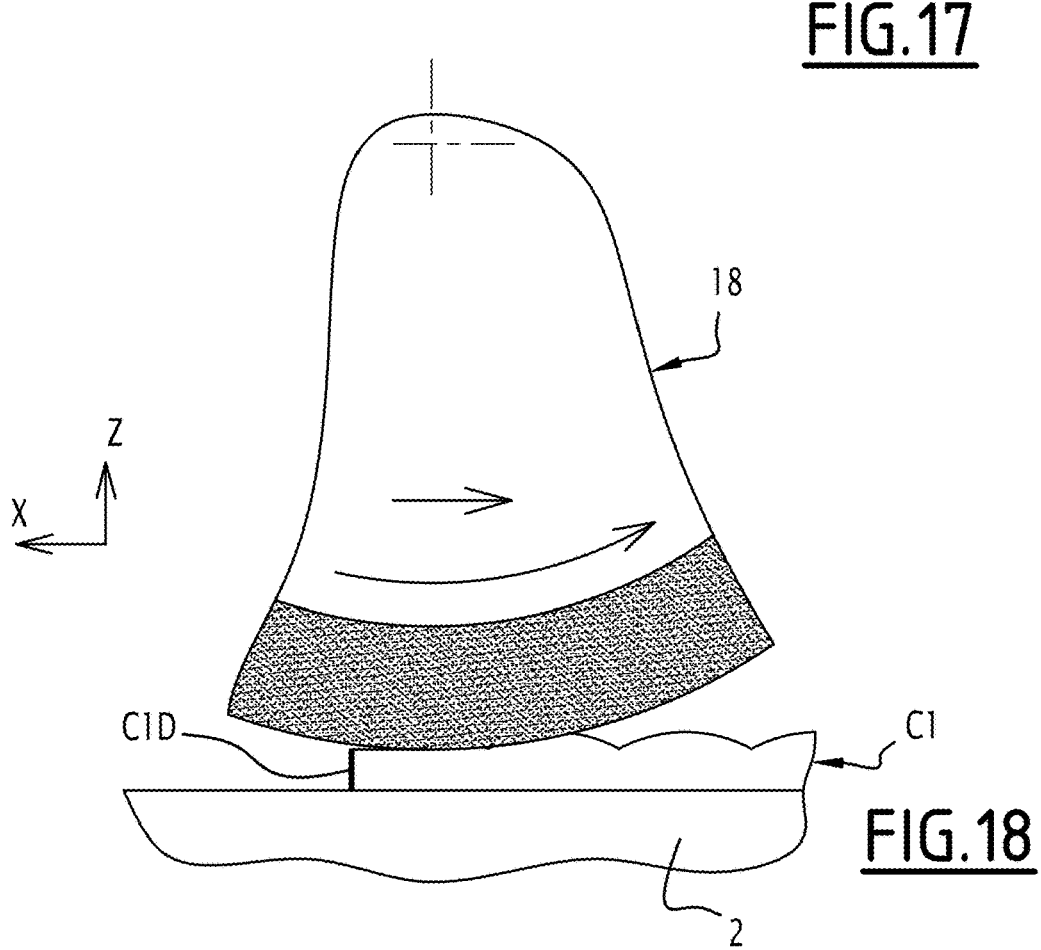
FIG. 18 is an enlarged view of circled detail XVIII of FIG. 17.

Before moving on to the production of a new layer of the object O, to be superimposed on the layer C1, the method advantageously provides for carrying out a cutting step, illustrated by FIGS. 15 and 16, and/or carrying out a grinding step, illustrated by FIGS. 17 and 18.

The cutting step consists of cutting the strips F1C1 and F2C1 on the peripheral border of their fused portions, as indicated by the thick line C1D in FIGS. 15 and 16. It will be understood that the strips F1C1 and F2C1 are thus cut along a contour of the object O, i.e., the contour of the latter at the layer C1. In practice, this cutting step is advantageously done by laser ablation, using the laser 16, by causing its beam L to travel the aforementioned contour.

The grinding step in turn consists of flattening, by removing material, the face of the strips F1C1 and F2C1, oriented along the axis Z, opposite the support 2. In practice, as illustrated by FIGS. 17 and 18, this grinding step uses an ad hoc grinding tool 18 belonging to the manufacturing facility 1, if applicable by moving this grinding tool 18 over the aforementioned face of the strips F1C1 and F2C1 of the layer C1. This grinding tool 18 is for example a mill or a laser, the beam of which shaves the aforementioned face of the layer C1, to perform the surface ablation. It will be understood that the performance of this grinding step leads to calibrating the thickness of the layer C1, by locally removing at least one of the overthicknesses of the fused portions belonging to this layer.

It will be noted that in some cases, the grinding step is not useful, since its calibrating effect on the thickness of the layer C1 will be negligible. In other cases, the grinding step will be necessary due to the profile of the fused portions, as shown in an exaggerated manner in FIG. 18. In still other cases, the grinding step will be carried out when one wishes to make a non-negligible reduction in the thickness of material deposited and fused for the layer C1: for example, locally, the performance of this grinding step can thus be motivated by the presence of so-called undercut zones, where the quality of the definition is directly related to the thickness of material deposited per layer.

Figure 19:
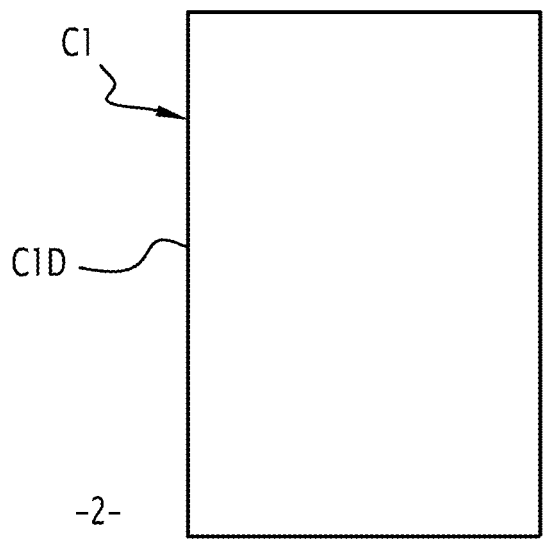
FIG. 19 is a view similar to FIG. 15, showing the layer resulting from the implementation of the various operations illustrated by FIGS. 1 to 18.

At the end of the cutting and grinding steps, the layer C1 of the object O to be manufactured is as shown in FIG. 19. In this FIG. 19, as well as in the following figures, the contour of the layer C1 is deliberately thickened, and referenced C1 D. Taking the preceding into account, it will thus be understood that the positioning of the strips F1C1 and F2C1, in particular the part F1C1.1 of the strip F1C1, has been determined, at the very beginning of the manufacturing method, taking into account the layer C1 to be produced, in particular its contour C1D.

In FIGS. 20 to 28, the method for manufacturing the object O continues by producing, via the facility 1, a second layer C2 of the object O, which is superimposed, along the axis Z, on the layer C1.

For reasons that will appear later, before the operations to produce the layer C2 begin, the layer C1 is pivoted around the axis Z-Z, for example by 90° in the figures, as indicated by arrow R1 in FIG. 20. The angular orientation, around the axis Z, of the layer C2 is thus modified relative to that of the layer previously produced C1. In practice, the value of the pivot angle for the layer previously produced is not limited to 90° like in the example shown in FIG. 20, but can be chosen freely, once this value is different from 0° and 180°.

Figure 20:
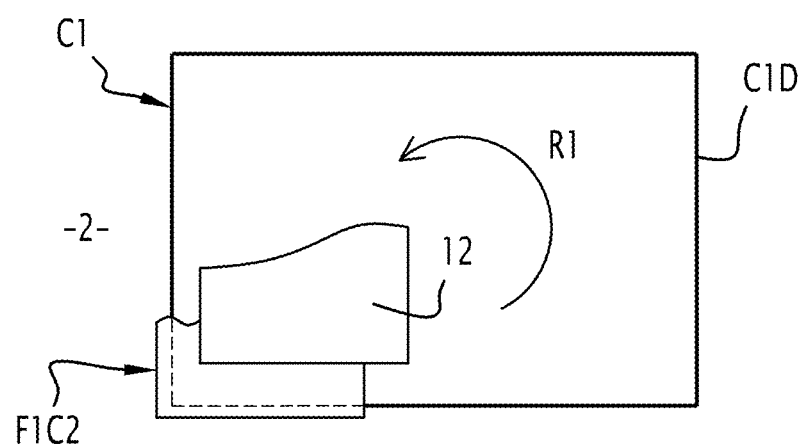
FIGS. 20 to 26 are views similar to FIGS. 4, 7 and 10 to 13, illustrating the production of a layer superimposed on the layer of FIG. 19.
Figure 21:
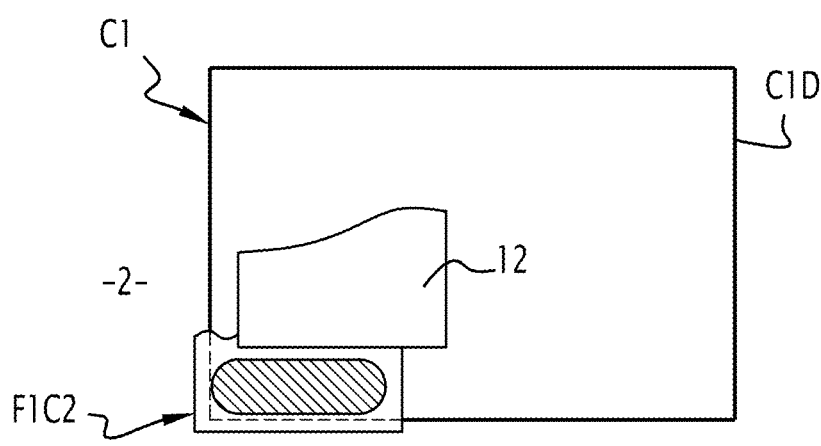
Figure 22:
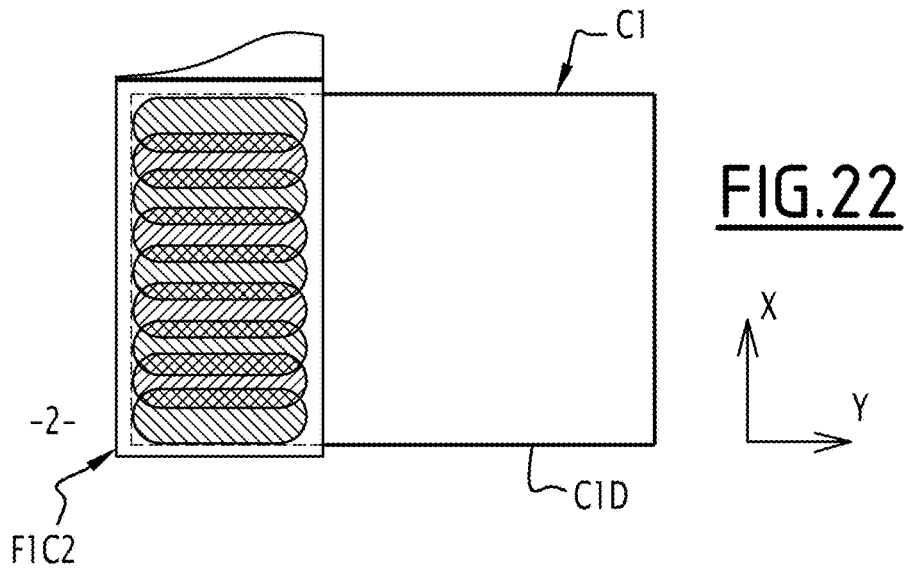

In FIGS. 20 to 22, the device 10 is used to produce a part of the layer C2 from a strip F1C2. To do this, the deposition step and the fusion step are carried out and repeated, described previously for the strip F1C1 of the layer C1, until obtaining, in the example considered in the figures, nine fused portions within the strip F1C2, as shown in FIG. 22. Due to the presence of the layer C1 below the layer C2, the strip F1C2 is pressed, along the axis Z, in contact against the layer C1 by the implementation of the deposition steps, and the fused portions of this strip F1C2 are welded to the layer C1 by carrying out the fusion steps.

Figure 23:
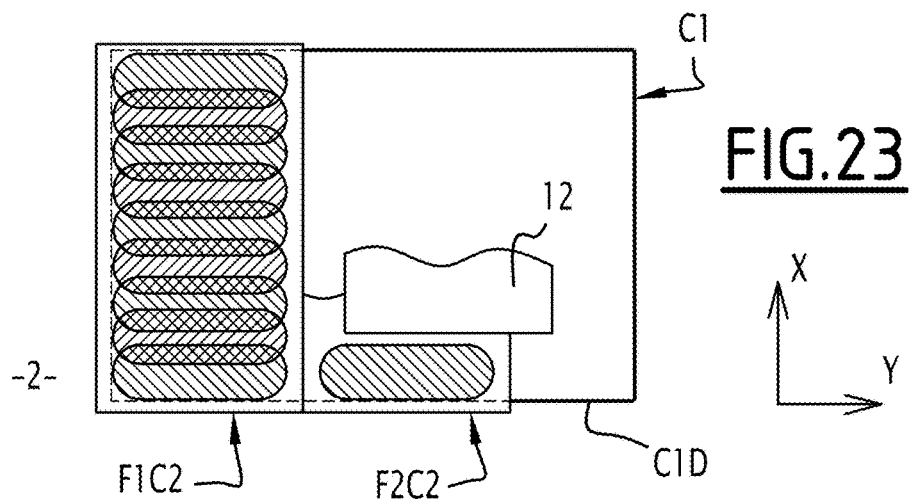
Figure 24:
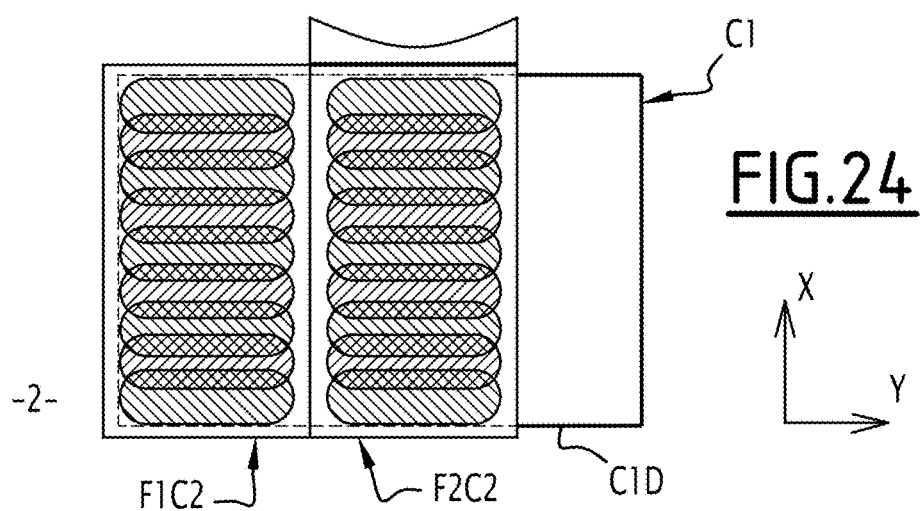

In FIGS. 23 and 24, the deposition and fusion steps are carried out again and repeated, applying them to another strip F2C2 of the layer C2, like what had been done for the strip F2C1 of the layer C1.

Figure 25:
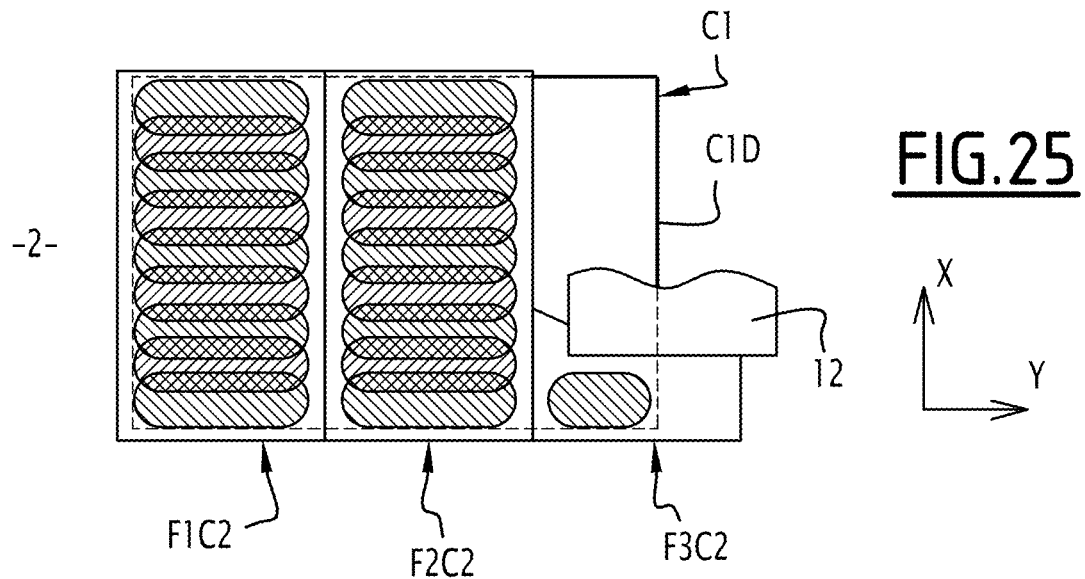
Figure 26:
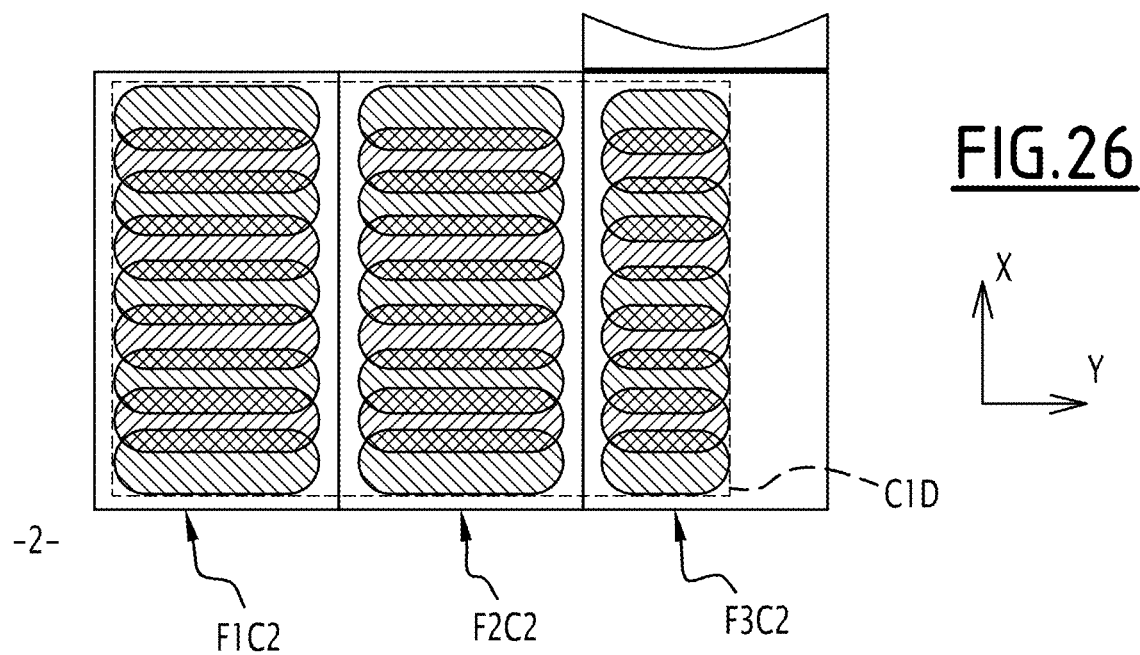

In FIGS. 25 and 26, the deposition and fusion steps are once again carried out and repeated, applying them to another strip F3C2, which, within the layer C2, is laterally juxtaposed with the strip F2C2. It will be noted that for the example embodiment, as shown in FIGS. 25 and 26, the fused portions of the strip F3C2 do not extend as much, along the axis Y, as the fused portions of the other strips F1C2 and F2C2: this is related to the fact that the section of the object O to be manufactured, at the layer C2, extends, along the axis Y, over less than three times the corresponding dimension of the fused portions of the strips F1C2 and F2C2, such that extending the fused portions of the strip F3C2 further would be pointless for the manufacturing of the object O.

After producing the respective fused portions of the strips F1C2, F2C2 and F3C2, these portions are connected to one another and to the layer C1 by welding the lateral edge(s) of the strips, in contact with one another, as shown in FIG. 27. It will be noted that by modifying the angular orientation, around the axis Z, of the layer C2 relative to that of the layer C1, one avoids superimposing the junction zones in parallel between the lateral edges of the strips F1C1 and F2C1 of the layer C1 and the junction zones between the lateral edges of the strips F1C2, F2C2 and F3C2 of the layer C2, which favors the homogeneity of the metal structure formed by the layers C1 and C2.

FIGS. 27 and 28 illustrate the implementation of a subsequent step of the method, similar to the cutting step previously mentioned in light of FIGS. 15 and 16: during this new cutting step, the strips F1C2, F2C2 and F3C2 of the layer C2 are cut on the peripheral border of their respective fused portions, along the contour of the object O at the layer C2, as indicated by the thick line C2D in FIGS. 27 and 28.

At the end of this cutting step, as well as, if applicable, a grinding step of the layer C2, similar to that previously described in light of FIGS. 17 and 18 for the layer C1, the layer C2 is as obtained in FIG. 29, in particular with its contour C2D drawn in thick lines in this FIG. 29, as well as in the following figures.

Figure 30:
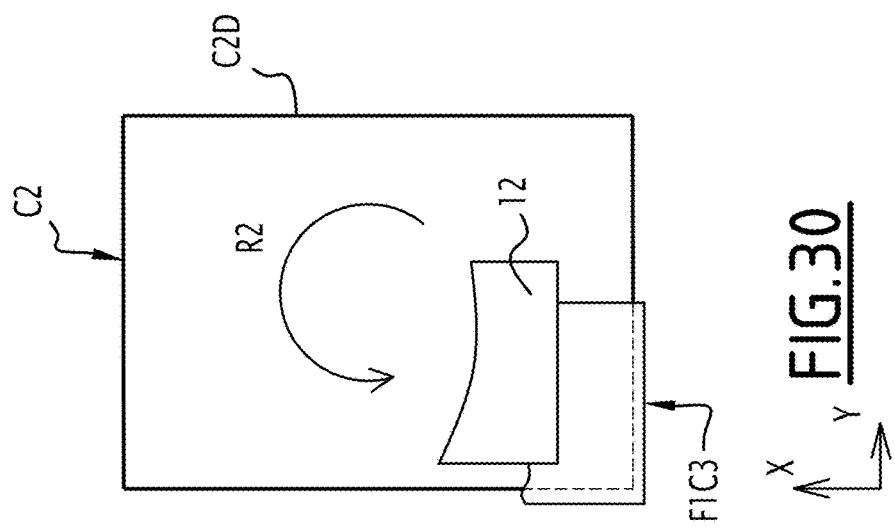

In FIGS. 30 to 35, a third layer C3 of the object O is made via the facility 1. This layer C3, which is superimposed on the layer C2, is made from strips F1C3 and F2C3, in exactly the same way as the layer C1, such that the corresponding steps and operations, in particular illustrated by FIGS. 30 to 35, will not be described here in more detail, the reader being able to refer to the explanations given previously in light of FIGS. 1 to 19. Advantageously, as indicated in FIG. 30, the production of the layer C3 is preceded by pivoting of 90°, indicated by arrow R2, of the layer C2, and thus of the layer C1, to which the layer C2 is welded, according to considerations similar to those previously developed in light of FIG. 20 in connection with arrow R1.

At the end of the steps and operations to produce the layer C3, the latter is as shown in FIGS. 34 and 35, in particular with its outline C3D drawn by a thick line. At this stage, the object O is made up of superimposed layers C1, C2 and C3 welded to one another.

An optional arrangement of the manufacturing method can be carried out on the object O, as illustrated by FIGS. 36 and 37. This arrangement consists of machining, transversely to the axis Z, the peripheral border of at least some of the layers of the object O made thus far, for example the peripheral border of the layers C1 and C2 in the example illustrated in FIGS. 36 and 37. The purpose of this machining is to perform finishing of all or part of the contours C1D and C2D of the layers C1 and C2, while obtaining, at the end of this machining, a finished contour OF of the object O at these layers C1 and C2. Advantageously, this machining operation is done by micro-machining. In practice, the tools used to perform this operation are for example an electric spindle, provided with cutting or abrasive tools, or a laser whose beam is configured to perform an ablation, such as micro-cutting, for example. In all cases, this machining operation is targeted and makes it possible to meet surface quality and dimensional precision requirements for the object O: as a non-limiting example, the obtained finished contour OF has a roughness Ra of about 1.6 µm, or even 0.8 µm, and a dimensional precision of about +− 0.01 mm. Of course, this machining operation is done depending on the needs, based on the object O to be manufactured, which means that this operation is not necessary over the entire object O; in other words, the final contour of the object O may correspond, in certain zones and for certain layers, to the finished contour OF obtained at the end of the machining operation, the rest of the final contour corresponding to the so-called raw contour of the layers, obtained at the end of the cutting steps carried out during the successive production of the layers.

Moreover, various arrangements and alternatives of the method and/or the facility 1, described thus far, can be considered.

Thus, according to one additional, or even alternative, embodiment, the fusion welding described thus far as being done by applying the beam L of the laser 16, can be done, in whole or in part, by resistance welding using electrodes. Without going into the detail here of resistance welding operations, which are known in themselves, the use of resistance welding electrodes allows a combined application of the forces FZ and FY, along the axes Z and Y, respectively, directly through the action of this resistance welding electrode rather than by the nozzle 12. Furthermore, the force FY applied by such a resistance welding electrode advantageously further makes it possible to produce the welds between the respective lateral edges of the strips in contact with one another, simultaneously with the implementation of the fusion operations resulting in the welds of the fused portions described above. Furthermore, if the corresponding facility 1 does not have any laser, the individual cutting operations of the strips, as shown in FIGS. 9, 13, 22, 24, 26 and 33, are done by simultaneous action of a so-called cutting electrode and the system 14, the latter then being provided to act by applying a mechanical traction action on the strip oriented in the direction opposite the arrow F14 shown in FIG. 1, in order to cut the strip. The cutting steps illustrated by FIGS. 15 and 16, 27 and 28, and 34 and 35 are done directly with a cutting or abrasive machining tool, according to the principle described in light of FIGS. 36 and 37, but applied only to the last layer produced.

The object of the additional, or even alternative, embodiment just described is to decrease the cost of the facility 1, while making it possible to carry out the method according to the invention without including a laser in this facility, such as the laser 16, the financial investment for which is high.

According to another alternative aspect of the manufacturing method, each of the strips used, or at least some of them, can have a metallurgical composition and/or a thickness and/or a width different from that of the others, within the limits of the physicochemical compatibilities that are acceptable for the object O to be manufactured. According to this principle, the manufacturing facility 1 is then advantageously equipped with several devices 10 making it possible respectively to distribute strips whose metallurgical grades, thicknesses and widths are different from one another.

According to still another alternative aspect of the manufacturing method, the sequence of the deposition and fusion steps relative to a first strip and relative to a second strip adjacent to the aforementioned strip within a same first layer of the object to be manufactured, can be different from that described in light of the figures. In particular, subject to ad hoc developments of the manufacturing facility 1, at least some of the deposition and fusion steps relative to the second strip can be carried out simultaneously with at least some of the deposition and fusion steps relative to the first strip, as long as each deposition step relative to the second strip is carried out while the first strip is, through any appropriate means, stationary relative to the previously deposited layer, or if the latter is not present, the support 2.

The invention claimed is:

1. A method for manufacturing a three-dimensional object,
wherein planar layers are produced one after another such that each newly produced layer is superimposed, along a first axis that is perpendicular to the respective planes of the layers, on a layer previously produced or, when a layer previously produced is not present, on a planar metal support that is perpendicular to the first axis, each of these layers being made up of at least one metal strip such that the or each strip of each layer occupies the entire thickness, along the first axis, of the corresponding layer,
said method providing, to produce each layer:
carrying out a deposition step, during the entire duration of which a part of the or each strip of the layer to be produced is pressed, along the first axis, in contact against the layer previously produced or, when a layer previously produced is not present, against the support;
carrying out a fusion step, which is done during the deposition step and during which only a portion, called fused, of said part of the or each strip is welded by fusion to the layer previously produced or, when a layer previously produced is not present, the support, such that, at the end of this fusion step, the rest of said part, which has not been fused, includes the edges of said part, arranged transversely to the plane of the layer to be produced, and is still in contact with the layer previously produced or, when a layer previously produced is not present, the support; and
repeating said deposition and fusion steps several times by applying them to as many corresponding parts of the or each strip, which are offset from one another in a second axis perpendicular to the first axis, such that the fused portions of two of said parts following one another in the second axis overlap, so that all of the fused portions that are obtained after having repeated the deposition and fusion steps relative to the strip(s) jointly form a two-dimensional section of the object to be manufactured.

2. The method according to claim 1, wherein, when the layer to be produced is made up of several strips, each deposition step relative to a second of the strips:
is carried out while a first of the strips is stationary relative to the layer previously produced or, when a layer previously produced is not present, to the support, and provides, throughout its entire duration, for placing the respective lateral edges of the first and second strips in contact with one another along a third axis that is perpendicular to both the first axis and the second axis,
and, at the end of or during the fusion steps relative to the second strip, the respective lateral edges of the first and second strips are welded by fusion both to the layer previously produced or, when a layer previously produced is not present, to the support, and to one another by connecting the corresponding fused portions of the first and second strips.

3. The method according to claim 2, wherein the deposition steps relative to the second strip are carried out at the end of at least some, or even all of the deposition and fusion steps relative to the first strip.

4. The method according to claim 2, wherein a beam of a laser is applied on the strip(s) of each layer to be produced to carry out at least some, or even all the welding operations of the respective lateral edges of the first and second strips.

5. The method according to claim 2, wherein at least one resistance welding electrode is applied on the strip(s) of each layer to be produced to carry out at least some, or even all of the welding operations of the respective lateral edges of the first and second strips.

6. The method according to claim 1, wherein at least two strips of a same layer or two superimposed strips have different respective chemical compositions from one another.

7. The method according to claim 1, wherein at least two strips of a same layer or two superimposed strips have different thicknesses from one another or different widths from one another.

8. The method according to claim 1, wherein the method further provides, to produce at least one of the layers, for carrying out a cutting step, which is carried out after having repeated the deposition and fusion steps relative to the layer in question, and during which the strip(s) of the layer in question are cut on the peripheral border of their fused portions, along a corresponding contour of the object.

9. The method according to claim 8, wherein a beam of a laser is applied on the strip(s) of each layer to be produced to carry out at least some, or even all the cutting steps.

10. The method according to claim 1, wherein the method further provides, to produce at least one of the layers, for carrying out a grinding step, which is carried out after having repeated the deposition and fusion steps relative to the layer in question, and during which the face of the strip(s) of the layer in question, which is turned, along the first axis, away from the layer previously produced or, when a layer previously produced is not present, away from the support, is flattened by removing material.

11. The method according to claim 10, wherein a beam of a laser is applied on the strip(s) of each layer to be produced to carry out at least some, or even all the grinding steps.

12. The method according to claim 1, wherein, after having produced each layer and before producing the following layer, the angular orientation, around the first axis, of the layer to be produced is modified relative to that of the layer previously produced.

13. The method according to claim 1, wherein, after having produced at least several of the layers, the peripheral border of at least some of the produced layers is machined transversely to the first axis.

14. The method according to claim 13, wherein the peripheral border of at least some of the produced layers is machined by micro-machining.

15. The method according to claim 1, wherein a beam of a laser is applied on the strip(s) of each layer to be produced to carry out at least some, or even all of the fusion steps.

16. The method according to claim 1, wherein at least one resistance welding electrode is applied on the strip(s) of each layer to be produced to carry out at least some, or even all of the fusion steps.

17. A facility for manufacturing a three-dimensional object,
  including a device suitable for producing, one after the other, planar layers such that each layer newly produced by the device is superimposed, along a first axis that is perpendicular to the respective planes of the layers, on a layer previously produced or, when a layer previously produced is not present, a planar metal support that is perpendicular to the first axis, each of the layers made by the device being made up of at least one metal strip such that the or each strip of each layer occupies the entire thickness, along the first axis, of the corresponding layer, the device comprising:

deposition means that are suitable for pressing, along the first axis, part of the strip of a layer to be produced in contact against the layer previously produced or, when a layer previously produced is not present, against the support;

fusion means that are suitable for fusion welding, on the layer previously produced or, when a layer previously produced is not present, the support, only a portion, called fused, of the part, pressed by the deposition means, of the strip of a layer to be produced such that, after application of the fusion means, the rest of said part, which has not been fused, includes the edges of said part, arranged transversely to the plane of the layer to be produced, and is still in contact with the layer previously produced or, when a layer previously produced is not present, the support; and movement means that are suitable for moving, in a second axis that is perpendicular to the first axis, with respect to one another, the strip of a layer to be produced on the one hand and the deposition means and the fusion means on the other hand, so as to enable applying the deposition means and the fusion means to several corresponding parts of the strip that are offset from one another in the second axis.

18. The facility according to claim 17, wherein the fusion means comprise a laser.

19. The facility according to claim 17, wherein the fusion means comprise at least one resistance welding electrode.

* * * * *